(12) United States Patent
Bhattad et al.

(10) Patent No.: US 12,537,633 B2
(45) Date of Patent: Jan. 27, 2026

(54) TECHNIQUES FOR ADJUSTING CONTENTION WINDOW IN UNLICENSED NEW RADIO

(71) Applicant: QUALCOMM Incorporated, San Diego, CA (US)

(72) Inventors: Kapil Bhattad, Bangalore (IN); Xiaoxia Zhang, San Diego, CA (US); Pravjyot Singh Deogun, Bengaluru (IN); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 903 days.

(21) Appl. No.: 17/755,036

(22) PCT Filed: Oct. 29, 2020

(86) PCT No.: PCT/US2020/070719
§ 371 (c)(1),
(2) Date: Apr. 19, 2022

(87) PCT Pub. No.: WO2021/092614
PCT Pub. Date: May 14, 2021

(65) Prior Publication Data
US 2022/0399964 A1 Dec. 15, 2022

(30) Foreign Application Priority Data
Nov. 6, 2019 (IN) .............................. 201941045068

(51) Int. Cl.
*H04L 1/1867* (2023.01)
*H04L 1/1812* (2023.01)
(Continued)

(52) U.S. Cl.
CPC .......... *H04L 1/1887* (2013.01); *H04L 1/1812* (2013.01); *H04L 1/1854* (2013.01); *H04W 74/0808* (2013.01)

(58) Field of Classification Search
CPC ... H04L 1/1887; H04L 1/1812; H04L 1/1854; H04W 74/0808
See application file for complete search history.

(56) References Cited

U.S. PATENT DOCUMENTS

| 2017/0257850 | A1 | 9/2017 | Oh et al. |
| 2018/0027554 | A1 | 1/2018 | Yerramalli et al. |
| 2022/0312481 | A1* | 9/2022 | Talarico ................. H04L 1/187 |

FOREIGN PATENT DOCUMENTS

| CN | 109005596 A | 12/2018 |
| CN | 109644087 A | 4/2019 |

(Continued)

OTHER PUBLICATIONS

International Search Report and Written Opinion—PCT/US2020/070719—ISA/EPO—Apr. 16, 2021.
(Continued)

*Primary Examiner* — Eric Myers
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may transmit an uplink communication, associated with a reference duration, in an uplink burst. The UE may receive hybrid automatic repeat request (HARQ) feedback after transmitting the uplink communication. The UE may adjust a size of a listen before talk (LBT) contention window based at least in part on whether the HARQ feedback is associated with the reference duration. Numerous other aspects are provided.

30 Claims, 27 Drawing Sheets

600 ⟶

604
Select a channel access priority that satisfies the channel access priority threshold

602
Receive an indication of a channel access priority threshold

UE

606
Perform an LBT procedure in an LBT contention window that is based at least in part on the channel access priority

BS

(51) Int. Cl.
H04L 1/1829 (2023.01)
H04W 74/0808 (2024.01)

(56) References Cited

FOREIGN PATENT DOCUMENTS

| | | | |
|---|---|---|---|
| EP | 3624538 | B1 | 6/2022 |
| JP | 2018520614 | A | 7/2018 |
| KR | 20190104986 | A | 9/2019 |
| WO | 2018223893 | A1 | 12/2018 |

OTHER PUBLICATIONS

Lenovo: "Contention Window Size Adjustment for LBT Category 4 for LAA POSCH Transmission", 3GPP TSG RAN WG1 Meeting #83, 3GPP Draft, R1-156733, 3rd Generation Partnership Project (3GPP), Mobile Competence Centre, 650, Route Des Lucioles, F-06921, Sophia-Antipolis Cedex, France, vol. RAN WG1, No, Anaheim, USA; Nov. 15, 2015-Nov. 22, 2015, Nov. 15, 2015 (Nov. 15, 2015), 6 Pages, XP051003113, Retrieved from the Internet: URL: http://www.3gpp.org/ftp/Meetings_3GPP_SYNC/RAN1/Docs/ [retrieved on Nov. 15, 2015], pp. 1-5.

Partial International Search Report—PCT/US2020/070719—ISA/EPO—Feb. 17, 2021.

Sequans Communications: "Considerations for the Cat 4 CW Size Adjustment", 3GPP TSG RAN WG1 Meeting #86, 3GPP Draft; R1-167769, 3rd Generation Partnership Project (3GPP), Mobile Competence Centre, 650, Route Des Lucioles, F-06921, Sophia-Antipolis Cedex, France, vol. RAN WG1, No, Gothenburg, Sweden; Aug. 22, 2016-Aug. 26, 2016, Aug. 21, 2016 (Aug. 21, 2016), 4 Pages, XP051140801, Retrieved from the Internet: URL: http://www.3gpp.org/ftp/Meetings_3GPP_SYNC/RAN1/Docs/ [retrieved on Aug. 21, 2016], pp. 1-3.

Huawei, et al., "Contention Window Size Adjustment for UL Category 4 LBT for eLAA", 3GPP TSG RAN WG1 Meeting #84bis, R1-162129, 3rd Generation Partnership Project, Mobile Competence Centre, 650, Route Des Lucioles, F-06921 Sophia-Antipolis Cedex, France, vol. RAN WG1, No. Busan, Korea, Apr. 11, 2016-Apr. 15, 2016, Apr. 2, 2016, XP051079976, 4 Pages.

\* cited by examiner

TECHNIQUES FOR ADJUSTING CONTENTION WINDOW IN UNLICENSED NEW RADIO

CROSS-REFERENCE TO RELATED APPLICATIONS

This application is a 371 national stage of PCT Application No. PCT/US2020/070719 filed on Oct. 29, 2020, entitled "TECHNIQUES FOR ADJUSTING CONTENTION WINDOW IN UNLICENSED NEW RADIO," which claims priority to India patent application No. 201941045068, filed on Nov. 6, 2019, entitled "TECHNIQUES FOR ADJUSTING CONTENTION WINDOW IN UNLICENSED NEW RADIO," each Application being considered part of and being incorporated by reference into this Patent Application.

FIELD OF THE DISCLOSURE

Aspects of the present disclosure generally relate to wireless communication and to techniques for adjusting a contention window in unlicensed New Radio.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting an uplink communication, associated with a reference duration, in an uplink burst; receiving hybrid automatic repeat request (HARQ) feedback after transmitting the uplink communication; and adjusting a size of a listen before talk (LBT) contention window based at least in part on whether the HARQ feedback is associated with the reference duration.

In a first aspect, the method further comprises determining that the HARQ feedback is associated with the uplink communication that is associated with the reference duration; determining that the HARQ feedback comprises an acknowledgement (ACK); and wherein adjusting the size of the LBT contention window comprises setting the size of the LBT contention window based at least in part on determining that the HARQ feedback is an ACK and is associated with the uplink communication that is associated with the reference duration. In a second aspect, alone or in combination with the first aspect, the method further comprises determining that the HARQ feedback is associated with the uplink communication that is associated with the reference duration; determining that the HARQ feedback comprises a negative acknowledgement (NACK); and wherein adjusting the size of the LBT contention window comprises increasing the size of the LBT contention window based at least in part on determining that the HARQ feedback is a NACK and is associated with the uplink communication that is associated with the reference duration.

In a third aspect, alone or in combination with one or more of the first and second aspects, the method further comprises determining that the HARQ feedback is not associated with the uplink communication that is associated with the reference duration; and wherein adjusting the size of the LBT contention window comprises refraining from adjusting the size of the LBT contention window based at least in part on determining that the HARQ feedback is not associated with the uplink communication that is associated with the reference duration.

In some aspects, a method of wireless communication, performed by a UE, may include transmitting an uplink communication after performing an LBT procedure during an LBT contention window; determining a duration of a HARQ feedback window for receiving HARQ feedback associated with the uplink communication, wherein the duration of the HARQ feedback window is based at least in part on a physical uplink shared channel (PUSCH) processing time and a physical downlink control channel (PDCCH) monitoring occasion configuration; and selectively adjusting a size of the LBT contention window based at least in part on whether the HARQ feedback is received during the duration of the HARQ feedback window.

In a first aspect, the method further comprises receiving an indication of the PUSCH processing time in a downlink communication. In a second aspect, alone or in combination with the first aspect, the indication of the PUSCH processing time comprises at least one of a dynamic feedback indication validity timer or a HARQ roundtrip time timer. In a third aspect, alone or in combination with one or more of the first and second aspects, determining the duration of the HARQ feedback window comprises determining the duration of the HARQ feedback window based at least in part on receiving an indication of the duration of the HARQ feedback window in a downlink communication.

In a fourth aspect, alone or in combination with one or more of the first through third aspects, determining the duration of the HARQ feedback window comprises determining an ending time of the HARQ feedback window as a next PDCCH monitoring occasion that occurs after expiration of the PUSCH processing time. In a fifth aspect, alone or in combination with one or more of the first through fourth aspects, determining the duration of the HARQ feedback window comprises determining an ending time of the HARQ feedback window as a next PDCCH monitoring occasion that occurs after expiration of the PUSCH processing time and during a discontinuous reception active time of the UE.

In a sixth aspect, alone or in combination with one or more of the first through fifth aspects, the method further comprises monitoring for the HARQ feedback during the duration of the HARQ feedback window in a same cell in which the uplink communication was transmitted. In a seventh aspect, alone or in combination with one or more of the first through sixth aspects, the method further comprises monitoring for the HARQ feedback during the duration of the HARQ feedback window in a cell that is different from the cell in which the uplink communication was transmitted.

In an eighth aspect, alone or in combination with one or more of the first through seventh aspects, the duration of the HARQ feedback window corresponds to a duration of a discontinuous reception (DRX) retransmission timer associated with a reference uplink transmission of an uplink burst in which the uplink communication was transmitted. In a ninth aspect, alone or in combination with one or more of the first through eighth aspects, the reference uplink transmission is a last reference uplink transmission in the uplink burst. In a tenth aspect, alone or in combination with one or more of the first through ninth aspects, the reference uplink transmission is a first reference uplink transmission in the uplink burst.

In some aspects, a method of wireless communication, performed by a UE, may include initiating an LBT procedure for transmitting an uplink communication; receiving, during the LBT procedure, HARQ feedback associated with a previous uplink communication; and selectively restarting the LBT procedure based at least in part on whether the HARQ feedback was received at a time that satisfies a threshold amount of time prior to an uplink resource for the uplink communication.

In a first aspect, selectively restarting the LBT procedure comprises restarting the LBT procedure based at least in part on receiving the HARQ feedback at a time that satisfies the threshold amount of time. In a second aspect, alone or in combination with the first aspect, the method further comprises adjusting, prior to restarting the LBT procedure, a size of an LBT contention window of the LBT procedure based at least in part on the HARQ feedback. In a third aspect, alone or in combination with one or more of the first and second aspects, selectively restarting the LBT procedure comprises proceeding with the LBT procedure based at least in part on receiving the HARQ feedback at a time that does not satisfy the threshold amount of time.

In a fourth aspect, alone or in combination with one or more of the first through third aspects, the method further comprises adjusting a size of an LBT contention window of another LBT procedure after the LBT procedure based at least in part on the HARQ feedback. In a fifth aspect, alone or in combination with one or more of the first through fourth aspects, the method further comprises receiving an indication of the threshold amount of time, wherein the threshold amount of time is based at least in part on a channel access priority class associated with the UE.

In a sixth aspect, alone or in combination with one or more of the first through fifth aspects, the threshold amount of time is based at least in part on an adjusted size of an LBT contention window associated with the LBT procedure, wherein the adjusted size of the LBT contention window is based at least in part on the HARQ feedback. In a seventh aspect, alone or in combination with one or more of the first through sixth aspects, the threshold amount of time is based at least in part on an adjusted LBT counter associated with the LBT procedure, wherein the adjusted LBT counter is based at least in part on the HARQ feedback.

In an eighth aspect, alone or in combination with one or more of the first through seventh aspects, the uplink resource is a first uplink resource in a plurality of consecutive uplink resources scheduled for the UE. In a ninth aspect, alone or in combination with one or more of the first through eighth aspects, the uplink resource is a last uplink resource in a plurality of consecutive uplink resources scheduled for the UE.

In some aspects, a method of wireless communication, performed by a UE, may include receiving an indication of a channel access priority threshold, wherein the channel access priority threshold identifies a lowest channel access priority permitted to be used by the UE; selecting, for an LBT procedure associated with an uplink communication, a channel access priority that satisfies the channel access priority threshold; and performing the LBT procedure in an LBT contention window, wherein a size of the LBT contention window is based at least in part on the channel access priority.

In some aspects, the method further comprises transmitting an indication of the size of the LBT contention window to a base station.

In some aspects, a method of wireless communication, performed by a BS, may include transmitting, to a UE, an uplink scheduling grant that schedules a plurality of consecutive uplink resources; identifying a channel access priority associated with the UE; and decoding a first subset of the plurality of consecutive uplink resources based at least in part on determining that an LBT contention window of the UE overlaps with a second subset of the plurality of consecutive uplink resources.

In some aspects, a method of wireless communication, performed by a BS, may include transmitting, to a UE, a first uplink scheduling grant that schedules a first uplink resource for transmission of an uplink communication, wherein the first uplink scheduling grant indicates that the UE is to continue with an LBT procedure for the uplink communication if the LBT procedure does not complete prior to the first uplink resource; and identifying, based at least in part on an expected time for completion of the LBT procedure, a second uplink resource for retransmission of the uplink communication; and transmitting, to the UE, a second uplink scheduling grant that schedules the second uplink resource, wherein the second uplink scheduling grant indicates that the UE is to refrain from adjusting a size of an LBT contention window of the LBT procedure based at least in part on the second uplink scheduling grant.

In some aspects, a method of wireless communication, performed by a UE, may include receiving a first uplink scheduling grant that schedules a first uplink resource for transmission of an uplink communication, wherein the first uplink scheduling grant indicates that the UE is to continue with an LBT procedure for the uplink communication if the LBT procedure does not complete prior to the first uplink resource; and receiving a second uplink scheduling grant that schedules a second uplink resource for retransmission of the uplink communication; and transmitting the uplink communication in the second uplink resource after completing the LBT procedure.

In some aspects, the method further comprises means for refraining, based at least in part on an indication in the second uplink scheduling grant, from adjusting a size of an LBT contention window of the LBT procedure based at least in part on the first uplink scheduling grant.

In some aspects, a method of wireless communication, performed by a UE, may include receiving an indication to initiate an LBT procedure prior to receiving an uplink scheduling grant; initiating the LBT procedure based at least in part on receiving the indication; and receiving the uplink scheduling grant while performing the LBT procedure.

In a first aspect, the method further comprises receiving another indication to perform the LBT procedure based at least in part on a particular channel access priority; and performing the LBT procedure based at least in part on the particular channel access priority. In a second aspect, alone or in combination with the first aspect, the method further comprises refraining from adjusting a size of an LBT contention window of the LBT procedure based at least in part on hybrid automatic repeat request feedback included in the uplink scheduling grant.

In some aspects, a method of wireless communication, performed by a UE, may include receiving an uplink scheduling grant that schedules an uplink resource for transmission of an uplink communication; determining that an LBT procedure for the uplink communication will not complete prior to the uplink resource; and transmitting an indication that the transmission of the uplink communication was not performed based at least in part on determining that the LBT procedure for the uplink communication will not complete prior to the uplink resource.

In some aspects, a UE for wireless communication may include memory and one or more processors operatively coupled to the memory. The memory and the one or more processors may be configured to transmit an uplink communication, associated with a reference duration, in an uplink burst; receive HARQ feedback after transmitting the uplink communication; and adjust a size of a listen before talk (LBT) contention window based at least in part on whether the HARQ feedback is associated with the reference duration.

In a first aspect, the one or more processors are further configured to determine that the HARQ feedback is associated with the uplink communication that is associated with the reference duration; and determine that the HARQ feedback comprises an ACK; and the one or more processors, when adjusting the size of the LBT contention window are to set the size of the LBT contention window based at least in part on determining that the HARQ feedback is an ACK and is associated with the uplink communication that is associated with the reference duration. In a second aspect, alone or in combination with the first aspect, the one or more processors are further configured to determine that the HARQ feedback is associated with the uplink communication that is associated with the reference duration; and determine that the HARQ feedback comprises a NACK; and the one or more processors, when adjusting the size of the LBT contention window, are to increase the size of the LBT contention window based at least in part on determining that the HARQ feedback is a NACK and is associated with the uplink communication that is associated with the reference duration.

In a third aspect, alone or in combination with one or more of the first and second aspects, the one or more processors are further configured to determine that the HARQ feedback is not associated with the uplink communication that is associated with the reference duration; and the one or more processors, when adjusting the size of the LBT contention window, are to refrain from adjusting the size of the LBT contention window based at least in part on determining that the HARQ feedback is not associated with the uplink communication that is associated with the reference duration.

In some aspects, a UE for wireless communication may include memory and one or more processors operatively coupled to the memory. The memory and the one or more processors may be configured to transmit an uplink communication after performing an LBT procedure during an LBT contention window; determine a duration of a HARQ feedback window for receiving HARQ feedback associated with the uplink communication, wherein the duration of the HARQ feedback window is based at least in part on a PUSCH processing time and a PDCCH monitoring occasion configuration; and selectively adjust a size of the LBT contention window based at least in part on whether the HARQ feedback is received during the duration of the HARQ feedback window.

In a first aspect, the one or more processors are further configured to receive an indication of the PUSCH processing time in a downlink communication. In a second aspect, alone or in combination with the first aspect, the indication of the PUSCH processing time comprises at least one of a dynamic feedback indication validity timer or a HARQ roundtrip time timer. In a third aspect, alone or in combination with one or more of the first and second aspects, the one or more processors, when determining the duration of the HARQ feedback window, are to determine the duration of the HARQ feedback window based at least in part on receiving an indication of the duration of the HARQ feedback window in a downlink communication.

In a fourth aspect, alone or in combination with one or more of the first through third aspects, the one or more processors, when determining the duration of the HARQ feedback window, are to determine an ending time of the HARQ feedback window as a next PDCCH monitoring occasion that occurs after expiration of the PUSCH processing time. In a fifth aspect, alone or in combination with one or more of the first through fourth aspects, the one or more processors, when determining the duration of the HARQ feedback window, are to determine an ending time of the HARQ feedback window as a next PDCCH monitoring occasion that occurs after expiration of the PUSCH processing time and during a discontinuous reception active time of the UE.

In a sixth aspect, alone or in combination with one or more of the first through fifth aspects, the one or more processors are further configured to monitor for the HARQ feedback during the duration of the HARQ feedback window in a same cell in which the uplink communication was transmitted. In a seventh aspect, alone or in combination with one or more of the first through sixth aspects, the one or more processors are further configured to monitor for the HARQ feedback during the duration of the HARQ feedback window in a cell that is different from the cell in which the uplink communication was transmitted.

In an eighth aspect, alone or in combination with one or more of the first through seventh aspects, the duration of the HARQ feedback window corresponds to a duration of a DRX retransmission timer associated with a reference uplink transmission of an uplink burst in which the uplink communication was transmitted. In a ninth aspect, alone or in combination with one or more of the first through eighth aspects, the reference uplink transmission is a last reference uplink transmission in the uplink burst. In a tenth aspect, alone or in combination with one or more of the first through ninth aspects, the reference uplink transmission is a first reference uplink transmission in the uplink burst.

In some aspects, a UE for wireless communication may include memory and one or more processors operatively coupled to the memory. The memory and the one or more processors may be configured to initiate an LBT procedure for transmitting an uplink communication; receive, during the LBT procedure, HARQ feedback associated with a previous uplink communication; and selectively restart the LBT procedure based at least in part on whether the HARQ feedback was received at a time that satisfies a threshold amount of time prior to an uplink resource for the uplink communication.

In a first aspect, the one or more processors, when selectively restarting the LBT procedure, are to restart the LBT procedure based at least in part on receiving the HARQ feedback at a time that satisfies the threshold amount of time. In a second aspect, alone or in combination with the first aspect, the one or more processors are further configured to adjust, prior to restarting the LBT procedure, a size of an LBT contention window of the LBT procedure based at least in part on the HARQ feedback. In a third aspect, alone or in combination with one or more of the first and second aspects, the one or more processors, when selectively restarting the LBT procedure, are to proceed with the LBT procedure based at least in part on receiving the HARQ feedback at a time that does not satisfy the threshold amount of time.

In a fourth aspect, alone or in combination with one or more of the first through third aspects, the one or more processors are further configured to adjust a size of an LBT contention window of another LBT procedure after the LBT procedure based at least in part on the HARQ feedback. In a fifth aspect, alone or in combination with one or more of the first through fourth aspects, the one or more processors are further configured to receive an indication of the threshold amount of time, wherein the threshold amount of time is based at least in part on a channel access priority class associated with the UE.

In a sixth aspect, alone or in combination with one or more of the first through fifth aspects, the threshold amount of time is based at least in part on an adjusted size of an LBT contention window associated with the LBT procedure, wherein the adjusted size of the LBT contention window is based at least in part on the HARQ feedback. In a seventh aspect, alone or in combination with one or more of the first through sixth aspects, the threshold amount of time is based at least in part on an adjusted LBT counter associated with the LBT procedure, wherein the adjusted LBT counter is based at least in part on the HARQ feedback.

In an eighth aspect, alone or in combination with one or more of the first through seventh aspects, the uplink resource is a first uplink resource in a plurality of consecutive uplink resources scheduled for the UE. In a ninth aspect, alone or in combination with one or more of the first through eighth aspects, the uplink resource is a last uplink resource in a plurality of consecutive uplink resources scheduled for the UE.

In some aspects, a UE for wireless communication may include memory and one or more processors operatively coupled to the memory. The memory and the one or more processors may be configured to receive an indication of a channel access priority threshold, wherein the channel access priority threshold identifies a lowest channel access priority permitted to be used by the UE; select, for an LBT procedure associated with an uplink communication, a channel access priority that satisfies the channel access priority threshold; and perform the LBT procedure in an LBT contention window, wherein a size of the LBT contention window is based at least in part on the channel access priority.

In some aspects, the one or more processors are further configured to transmit an indication of the size of the LBT contention window to a base station.

In some aspects, a BS for wireless communication may include memory and one or more processors operatively coupled to the memory. The memory and the one or more processors may be configured to transmit, to a UE, an uplink scheduling grant that schedules a plurality of consecutive uplink resources; identify a channel access priority associated with the UE; and decode a first subset of the plurality of consecutive uplink resources based at least in part on determining that an LBT contention window of the UE overlaps with a second subset of the plurality of consecutive uplink resources.

In some aspects, a BS for wireless communication may include memory and one or more processors operatively coupled to the memory. The memory and the one or more processors may be configured to transmit, to a UE, a first uplink scheduling grant that schedules a first uplink resource for transmission of an uplink communication, wherein the first uplink scheduling grant indicates that the UE is to continue with an LBT procedure for the uplink communication if the LBT procedure does not complete prior to the first uplink resource; and identify, based at least in part on an expected time for completion of the LBT procedure, a second uplink resource for retransmission of the uplink communication; and transmit, to the UE, a second uplink scheduling grant that schedules the second uplink resource, wherein the second uplink scheduling grant indicates that the UE is to refrain from adjusting a size of an LBT contention window of the LBT procedure based at least in part on the second uplink scheduling grant.

In some aspects, a UE for wireless communication may include memory and one or more processors operatively coupled to the memory. The memory and the one or more processors may be configured to receive a first uplink scheduling grant that schedules a first uplink resource for transmission of an uplink communication, wherein the first uplink scheduling grant indicates that the UE is to continue with an LBT procedure for the uplink communication if the LBT procedure does not complete prior to the first uplink resource; and receive a second uplink scheduling grant that schedules a second uplink resource for retransmission of the uplink communication; and transmit the uplink communication in the second uplink resource after completing the LBT procedure.

In some aspects, the one or more processors are further configured to refrain, based at least in part on an indication in the second uplink scheduling grant, from adjusting a size of an LBT contention window of the LBT procedure based at least in part on the first uplink scheduling grant.

In some aspects, a UE for wireless communication may include memory and one or more processors operatively coupled to the memory. The memory and the one or more processors may be configured to receive an indication to initiate an LBT procedure prior to receiving an uplink scheduling grant; initiate the LBT procedure based at least in part on receiving the indication; and receive the uplink scheduling grant while performing the LBT procedure.

In a first aspect, the one or more processors are further configured to receive another indication to perform the LBT procedure based at least in part on a particular channel access priority; and perform the LBT procedure based at least in part on the particular channel access priority. In a second aspect, alone or in combination with the first aspect, the one or more processors are further configured to refrain from adjusting a size of an LBT contention window of the LBT procedure based at least in part on hybrid automatic repeat request feedback included in the uplink scheduling grant.

In some aspects, a UE for wireless communication may include memory and one or more processors operatively coupled to the memory. The memory and the one or more processors may be configured to receive an uplink scheduling grant that schedules an uplink resource for transmission of an uplink communication; determine that a listen before talk (LBT) procedure for the uplink communication will not complete prior to the uplink resource; and transmit an indication that the transmission of the uplink communication was not performed based at least in part on determining that the LBT procedure for the uplink communication will not complete prior to the uplink resource.

In some aspects, a non-transitory computer-readable medium may store one or more instructions for wireless communication. The one or more instructions, when executed by one or more processors of a UE, may cause the one or more processors to: transmit an uplink communication, associated with a reference duration, in an uplink burst; receive HARQ feedback after transmitting the uplink communication; and adjust a size of an LBT contention window based at least in part on whether the HARQ feedback is associated with the reference duration.

In a first aspect, the one or more instructions, when executed by the one or more processors, further cause the one or more processors to determine that the HARQ feedback is associated with the uplink communication that is associated with the reference duration; and determine that the HARQ feedback comprises an ACK; and the one or more instructions, that cause the one or more processors to adjust the size of the LBT contention window, cause the one or more processors to set the size of the LBT contention window based at least in part on determining that the HARQ feedback is an ACK and is associated with the uplink communication that is associated with the reference duration. In a second aspect, alone or in combination with the first aspect, the one or more instructions, when executed by the one or more processors, further cause the one or more processors to determine that the HARQ feedback is associated with the uplink communication that is associated with the reference duration; and determine that the HARQ feedback comprises a NACK; and the one or more instructions, that cause the one or more processors to adjust the size of the LBT contention window, cause the one or more processors to increase the size of the LBT contention window based at least in part on determining that the HARQ feedback is a NACK and is associated with the uplink communication that is associated with the reference duration.

In a third aspect, alone or in combination with one or more of the first and second aspects, the one or more instructions, when executed by the one or more processors, further cause the one or more processors to determine that the HARQ feedback is not associated with the uplink communication that is associated with the reference duration; and the one or more instructions, that cause the one or more processors to adjust the size of the LBT contention window, cause the one or more processors to refrain from adjusting the size of the LBT contention window based at least in part on determining that the HARQ feedback is not associated with the uplink communication that is associated with the reference duration.

In some aspects, a non-transitory computer-readable medium may store one or more instructions for wireless communication. The one or more instructions, when executed by one or more processors of a UE, may cause the one or more processors to: transmit an uplink communication after performing an LBT procedure during an LBT contention window; determine a duration of a HARQ feedback window for receiving HARQ feedback associated with the uplink communication, wherein the duration of the HARQ feedback window is based at least in part on a PUSCH processing time and a PDCCH monitoring occasion configuration; and selectively adjust a size of the LBT contention window based at least in part on whether the HARQ feedback is received during the duration of the HARQ feedback window.

In a first aspect, the one or more instructions, when executed by the one or more processors, further cause the one or more processors to receive an indication of the PUSCH processing time in a downlink communication. In a second aspect, alone or in combination with the first aspect, the indication of the PUSCH processing time comprises at least one of a dynamic feedback indication validity timer or a HARQ roundtrip time timer. In a third aspect, alone or in combination with one or more of the first and second aspects, the one or more instructions, that cause the one or more processors to determine the duration of the HARQ feedback window, cause the one or more processors to determine the duration of the HARQ feedback window based at least in part on receiving an indication of the duration of the HARQ feedback window in a downlink communication.

In a fourth aspect, alone or in combination with one or more of the first through third aspects, the one or more instructions, that cause the one or more processors to determine the duration of the HARQ feedback window, cause the one or more processors to determine an ending time of the HARQ feedback window as a next PDCCH monitoring occasion that occurs after expiration of the PUSCH processing time. In a fifth aspect, alone or in combination with one or more of the first through fourth aspects, the one or more instructions, that cause the one or more processors to determine the duration of the HARQ feedback window, cause the one or more processors to determine an ending time of the HARQ feedback window as a next PDCCH monitoring occasion that occurs after expiration of the PUSCH processing time and during a discontinuous reception active time of the UE.

In a sixth aspect, alone or in combination with one or more of the first through fifth aspects, the one or more instructions, when executed by the one or more processors, further cause the one or more processors to monitor for the HARQ feedback during the duration of the HARQ feedback window in a same cell in which the uplink communication was transmitted. In a seventh aspect, alone or in combination with one or more of the first through sixth aspects, the one or more instructions, when executed by the one or more processors, further cause the one or more processors to monitor for the HARQ feedback during the duration of the HARQ feedback window in a cell that is different from the cell in which the uplink communication was transmitted.

In an eighth aspect, alone or in combination with one or more of the first through seventh aspects, the duration of the HARQ feedback window corresponds to a duration of a DRX retransmission timer associated with a reference uplink transmission of an uplink burst in which the uplink communication was transmitted. In a ninth aspect, alone or in combination with one or more of the first through eighth aspects, the reference uplink transmission is a last reference uplink transmission in the uplink burst. In a tenth aspect, alone or in combination with one or more of the first through ninth aspects, the reference uplink transmission is a first reference uplink transmission in the uplink burst.

In some aspects, a non-transitory computer-readable medium may store one or more instructions for wireless communication. The one or more instructions, when executed by one or more processors of a UE, may cause the one or more processors to: initiate an LBT procedure for transmitting an uplink communication; receive, during the LBT procedure, HARQ feedback associated with a previous uplink communication; and selectively restart the LBT procedure based at least in part on whether the HARQ feedback was received at a time that satisfies a threshold amount of time prior to an uplink resource for the uplink communication.

In a first aspect, the one or more instructions, that cause the one or processors to selectively restart the LBT procedure, cause the one or more processors to restart the LBT procedure based at least in part on receiving the HARQ feedback at a time that satisfies the threshold amount of time. In a second aspect, alone or in combination with the first aspect, the one or more instructions, when executed by the one or more processors, further cause the one or more processors to adjust, prior to restarting the LBT procedure, a size of an LBT contention window of the LBT procedure based at least in part on the HARQ feedback. In a third aspect, alone or in combination with one or more of the first and second aspects, the one or more instructions, that cause the one or more processors to selectively restart the LBT procedure, cause the one or more processors to proceed with the LBT procedure based at least in part on receiving the HARQ feedback at a time that does not satisfy the threshold amount of time.

In a fourth aspect, alone or in combination with one or more of the first through third aspects, the one or more instructions, when executed by the one or more processors, further cause the one or more processors to adjust a size of an LBT contention window of another LBT procedure after the LBT procedure based at least in part on the HARQ feedback. In a fifth aspect, alone or in combination with one or more of the first through fourth aspects, the one or more instructions, when executed by the one or more processors, further cause the one or more processors to receive an indication of the threshold amount of time, wherein the threshold amount of time is based at least in part on a channel access priority class associated with the UE.

In a sixth aspect, alone or in combination with one or more of the first through fifth aspects, the threshold amount of time is based at least in part on an adjusted size of an LBT contention window associated with the LBT procedure, wherein the adjusted size of the LBT contention window is based at least in part on the HARQ feedback. In a seventh aspect, alone or in combination with one or more of the first through sixth aspects, the threshold amount of time is based at least in part on an adjusted LBT counter associated with the LBT procedure, wherein the adjusted LBT counter is based at least in part on the HARQ feedback.

In an eighth aspect, alone or in combination with one or more of the first through seventh aspects, the uplink resource is a first uplink resource in a plurality of consecutive uplink resources scheduled for the UE. In a ninth aspect, alone or in combination with one or more of the first through eighth aspects, the uplink resource is a last uplink resource in a plurality of consecutive uplink resources scheduled for the UE.

In some aspects, a non-transitory computer-readable medium may store one or more instructions for wireless communication. The one or more instructions, when executed by one or more processors of a UE, may cause the one or more processors to: receive an indication of a channel access priority threshold, wherein the channel access priority threshold identifies a lowest channel access priority permitted to be used by the UE; select, for an LBT procedure associated with an uplink communication, a channel access priority that satisfies the channel access priority threshold; and perform the LBT procedure in an LBT contention window, wherein a size of the LBT contention window is based at least in part on the channel access priority.

In some aspects, the one or more instructions, when executed by the one or more processors, further cause the one or more processors to transmit an indication of the size of the LBT contention window to a base station.

In some aspects, a non-transitory computer-readable medium may store one or more instructions for wireless communication. The one or more instructions, when executed by one or more processors of a BS, may cause the one or more processors to: transmit, to a UE, an uplink scheduling grant that schedules a plurality of consecutive uplink resources; identify a channel access priority associated with the UE; and decode a first subset of the plurality of consecutive uplink resources based at least in part on determining that an LBT contention window of the UE overlaps with a second subset of the plurality of consecutive uplink resources.

In some aspects, a non-transitory computer-readable medium may store one or more instructions for wireless communication. The one or more instructions, when executed by one or more processors of a BS, may cause the one or more processors to: transmit, to a UE, a first uplink scheduling grant that schedules a first uplink resource for transmission of an uplink communication, wherein the first uplink scheduling grant indicates that the UE is to continue with an LBT procedure for the uplink communication if the LBT procedure does not complete prior to the first uplink resource; and identify, based at least in part on an expected time for completion of the LBT procedure, a second uplink resource for retransmission of the uplink communication; and transmit, to the UE, a second uplink scheduling grant that schedules the second uplink resource, wherein the second uplink scheduling grant indicates that the UE is to refrain from adjusting a size of an LBT contention window of the LBT procedure based at least in part on the second uplink scheduling grant.

In some aspects, a non-transitory computer-readable medium may store one or more instructions for wireless communication. The one or more instructions, when executed by one or more processors of a UE, may cause the one or more processors to: receive a first uplink scheduling grant that schedules a first uplink resource for transmission of an uplink communication, wherein the first uplink scheduling grant indicates that the UE is to continue with an LBT procedure for the uplink communication if the LBT procedure does not complete prior to the first uplink resource; and receive a second uplink scheduling grant that schedules a second uplink resource for retransmission of the uplink communication; and transmit the uplink communication in the second uplink resource after completing the LBT procedure.

In some aspects, the one or more instructions, when executed by the one or more processors, further cause the one or more processors to refrain, based at least in part on an indication in the second uplink scheduling grant, from adjusting a size of an LBT contention window of the LBT procedure based at least in part on the first uplink scheduling grant.

In some aspects, a non-transitory computer-readable medium may store one or more instructions for wireless communication. The one or more instructions, when executed by one or more processors of a UE, may cause the one or more processors to: receive an indication to initiate an LBT procedure prior to receiving an uplink scheduling grant; initiate the LBT procedure based at least in part on receiving the indication; and receive the uplink scheduling grant while performing the LBT procedure.

In a first aspect, the one or more instructions, when executed by the one or more processors, further cause the one or more processors to receive another indication to perform the LBT procedure based at least in part on a particular channel access priority; and perform the LBT procedure based at least in part on the particular channel access priority. In a second aspect, alone or in combination with the first aspect, the one or more instructions, when executed by the one or more processors, further cause the one or more processors to refrain from adjusting a size of an LBT contention window of the LBT procedure based at least in part on hybrid automatic repeat request feedback included in the uplink scheduling grant.

In some aspects, a non-transitory computer-readable medium may store one or more instructions for wireless communication. The one or more instructions, when executed by one or more processors of a UE, may cause the one or more processors to: receive an uplink scheduling grant that schedules an uplink resource for transmission of an uplink communication; determine that an LBT procedure for the uplink communication will not complete prior to the uplink resource; and transmit an indication that the transmission of the uplink communication was not performed based at least in part on determining that the LBT procedure for the uplink communication will not complete prior to the uplink resource.

In some aspects, an apparatus for wireless communication may include means for transmitting an uplink communication, associated with a reference duration, in an uplink burst; means for receiving HARQ feedback after transmitting the uplink communication; and means for adjusting a size of an LBT contention window based at least in part on whether the HARQ feedback is associated with the reference duration.

In a first aspect, the apparatus further comprises means for determining that the HARQ feedback is associated with the uplink communication that is associated with the reference duration; and means for determining that the HARQ feedback comprises an ACK; wherein the means for adjusting the size of the LBT contention window comprises means for setting the size of the LBT contention window based at least in part on determining that the HARQ feedback is an ACK and is associated with the uplink communication that is associated with the reference duration. In a second aspect, alone or in combination with the first aspect, the apparatus further comprises means for determining that the HARQ feedback is associated with the uplink communication that is associated with the reference duration; and means for determining that the HARQ feedback comprises a negative acknowledgement (NACK); wherein the means for adjusting the size of the LBT contention window comprises means for increasing the size of the LBT contention window based at least in part on determining that the HARQ feedback is a NACK and is associated with the reference duration.

In a third aspect, alone or in combination with one or more of the first and second aspects, the apparatus further comprises means for determining that the HARQ feedback is not associated with the uplink communication that is associated with the reference duration; wherein the means for adjusting the size of the LBT contention window comprises means for refraining from adjusting the size of the LBT contention window based at least in part on determining that the HARQ feedback is not associated with the uplink communication that is associated with the reference duration.

In some aspects, an apparatus for wireless communication may include means for transmitting an uplink communication after performing an LBT procedure during an LBT contention window; means for determining a duration of a HARQ feedback window for receiving HARQ feedback associated with the uplink communication, wherein the duration of the HARQ feedback window is based at least in part on a PUSCH processing time and a PDCCH monitoring occasion configuration; and means for adjusting a size of the LBT contention window based at least in part on whether the HARQ feedback is received during the duration of the HARQ feedback window.

In a first aspect, the apparatus further comprises means for receiving an indication of the PUSCH processing time in a downlink communication. In a second aspect, alone or in combination with the first aspect, the indication of the PUSCH processing time comprises at least one of a dynamic feedback indication validity timer or a HARQ roundtrip time timer. In a third aspect, alone or in combination with one or more of the first and second aspects, the means for determining the duration of the HARQ feedback window comprises means for determining the duration of the HARQ feedback window based at least in part on receiving an indication of the duration of the HARQ feedback window in a downlink communication.

In a fourth aspect, alone or in combination with one or more of the first through third aspects, the means for determining the duration of the HARQ feedback window comprises means for determining an ending time of the HARQ feedback window as a next PDCCH monitoring occasion that occurs after expiration of the PUSCH processing time. In a fifth aspect, alone or in combination with one or more of the first through fourth aspects, the means for determining the duration of the HARQ feedback window comprises means for determining an ending time of the HARQ feedback window as a next PDCCH monitoring occasion that occurs after expiration of the PUSCH processing time and during a discontinuous reception active time of the UE.

In a sixth aspect, alone or in combination with one or more of the first through fifth aspects, the apparatus further comprises means for monitoring for the HARQ feedback during the duration of the HARQ feedback window in a same cell in which the uplink communication was transmitted. In a seventh aspect, alone or in combination with one or more of the first through sixth aspects, the apparatus further comprises means for monitoring for the HARQ feedback during the duration of the HARQ feedback window in a cell that is different from the cell in which the uplink communication was transmitted.

In an eighth aspect, alone or in combination with one or more of the first through seventh aspects, the duration of the HARQ feedback window corresponds to a duration of a discontinuous reception (DRX) retransmission timer associated with a reference uplink transmission of an uplink burst in which the uplink communication was transmitted. In a ninth aspect, alone or in combination with one or more of the first through eighth aspects, the reference uplink transmission is a last reference uplink transmission in the uplink burst. In a tenth aspect, alone or in combination with one or more of the first through ninth aspects, the reference uplink transmission is a first reference uplink transmission in the uplink burst.

In some aspects, an apparatus for wireless communication may include means for initiating an LBT procedure for transmitting an uplink communication; means for receiving, during the LBT procedure, HARQ feedback associated with a previous uplink communication; and means for selectively restarting the LBT procedure based at least in part on whether the HARQ feedback was received at a time that satisfies a threshold amount of time prior to an uplink resource for the uplink communication.

In a first aspect, the means for selectively restarting the LBT procedure comprises means for restarting the LBT procedure based at least in part on receiving the HARQ feedback at a time that satisfies the threshold amount of time. In a second aspect, alone or in combination with the first aspect, the apparatus further comprises means for adjusting, prior to restarting the LBT procedure, a size of an LBT contention window of the LBT procedure based at least in part on the HARQ feedback. In a third aspect, alone or in combination with one or more of the first and second aspects, the means for selectively restarting the LBT procedure comprises means for proceeding with the LBT procedure based at least in part on receiving the HARQ feedback at a time that does not satisfy the threshold amount of time.

In a fourth aspect, alone or in combination with one or more of the first through third aspects, the apparatus further comprises means for adjusting a size of an LBT contention window of another LBT procedure after the LBT procedure based at least in part on the HARQ feedback. In a fifth aspect, alone or in combination with one or more of the first through fourth aspects, the apparatus further comprises means for receiving an indication of the threshold amount of time, wherein the threshold amount of time is based at least in part on a channel access priority class associated with the UE.

In a sixth aspect, alone or in combination with one or more of the first through fifth aspects, the threshold amount of time is based at least in part on an adjusted size of an LBT contention window associated with the LBT procedure, wherein the adjusted size of the LBT contention window is based at least in part on the HARQ feedback. In a seventh aspect, alone or in combination with one or more of the first through sixth aspects, the threshold amount of time is based at least in part on an adjusted LBT counter associated with the LBT procedure, wherein the adjusted LBT counter is based at least in part on the HARQ feedback.

In an eighth aspect, alone or in combination with one or more of the first through seventh aspects, the uplink resource is a first uplink resource in a plurality of consecutive uplink resources scheduled for the UE. In a ninth aspect, alone or in combination with one or more of the first through eighth aspects, the uplink resource is a last uplink resource in a plurality of consecutive uplink resources scheduled for the UE.

In some aspects, an apparatus for wireless communication may include means for receiving an indication of a channel access priority threshold, wherein the channel access priority threshold identifies a lowest channel access priority permitted to be used by the apparatus; means for selecting, for an LBT procedure associated with an uplink communication, a channel access priority that satisfies the channel access priority threshold; and means for performing the LBT procedure in an LBT contention window, wherein a size of the LBT contention window is based at least in part on the channel access priority.

In some aspects, the apparatus further comprises means for transmitting an indication of the size of the LBT contention window to a base station.

In some aspects, an apparatus for wireless communication may include means for transmitting, to a UE, an uplink scheduling grant that schedules a plurality of consecutive uplink resources; means for identifying a channel access priority associated with the UE; and means for decoding a first subset of the plurality of consecutive uplink resources based at least in part on determining that an LBT contention window of the UE overlaps with a second subset of the plurality of consecutive uplink resources.

In some aspects, an apparatus for wireless communication may include means for transmitting, to a UE, a first uplink scheduling grant that schedules a first uplink resource for transmission of an uplink communication, wherein the first uplink scheduling grant indicates that the UE is to continue with an LBT procedure for the uplink communication if the LBT procedure does not complete prior to the first uplink resource; means for identifying, based at least in part on an expected time for completion of the LBT procedure, a second uplink resource for retransmission of the uplink communication; and means for transmitting, to the UE, a second uplink scheduling grant that schedules the second uplink resource, wherein the second uplink scheduling grant indicates that the UE is to refrain from adjusting a size of an LBT contention window of the LBT procedure based at least in part on the second uplink scheduling grant.

In some aspects, an apparatus for wireless communication may include means for receiving a first uplink scheduling grant that schedules a first uplink resource for transmission of an uplink communication, wherein the first uplink scheduling grant indicates that the apparatus is to continue with an LBT procedure for the uplink communication if the LBT procedure does not complete prior to the first uplink resource; means for receiving a second uplink scheduling grant that schedules a second uplink resource for retransmission of the uplink communication; and means for transmitting the uplink communication in the second uplink resource after completing the LBT procedure.

In some aspects, the apparatus further comprises means for refraining, based at least in part on an indication in the second uplink scheduling grant, from adjusting a size of an LBT contention window of the LBT procedure based at least in part on the first uplink scheduling grant.

In some aspects, an apparatus for wireless communication may include means for receiving an indication to initiate an LBT procedure prior to receiving an uplink scheduling grant; means for initiating the LBT procedure based at least in part on receiving the indication; and means for receiving the uplink scheduling grant while performing the LBT procedure.

In a first aspect, the apparatus further comprises means for receiving another indication to perform the LBT procedure based at least in part on a particular channel access priority; and means for performing the LBT procedure based at least in part on the particular channel access priority. In a second aspect, alone or in combination with the first aspect, the apparatus further comprises means for refraining from adjusting a size of an LBT contention window of the LBT procedure based at least in part on hybrid automatic repeat request feedback included in the uplink scheduling grant.

In some aspects, an apparatus for wireless communication may include means for receiving an uplink scheduling grant that schedules an uplink resource for transmission of an uplink communication; means for determining that an LBT procedure for the uplink communication will not complete prior to the uplink resource; and means for transmitting an indication that the transmission of the uplink communication was not performed based at least in part on determining that the LBT procedure for the uplink communication will not complete prior to the uplink resource.

Aspects generally include a method, apparatus, system, computer program product, non-transitory computer-readable medium, user equipment, base station, wireless communication device, and/or processing system as substantially described herein with reference to and as illustrated by the accompanying drawings, and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including New Radio (NR) technologies.

Figure 1:
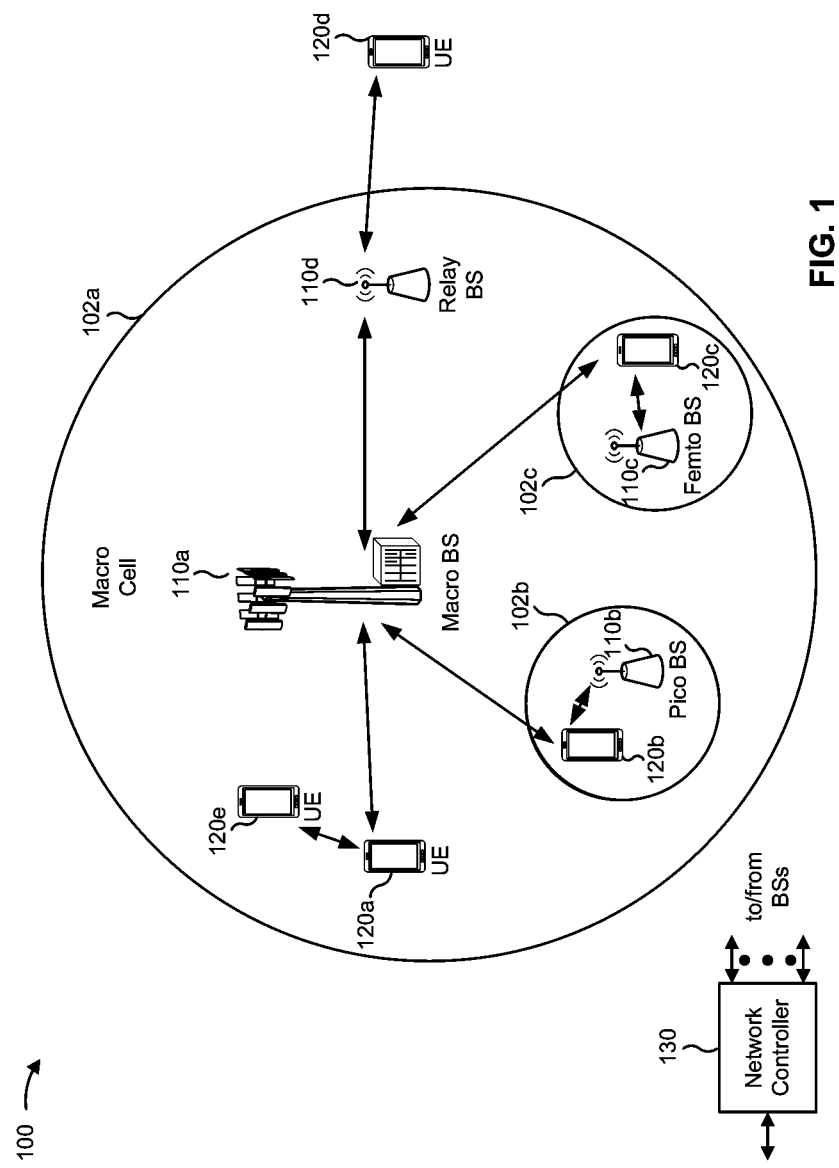
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another (e.g., directly or indirectly) via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
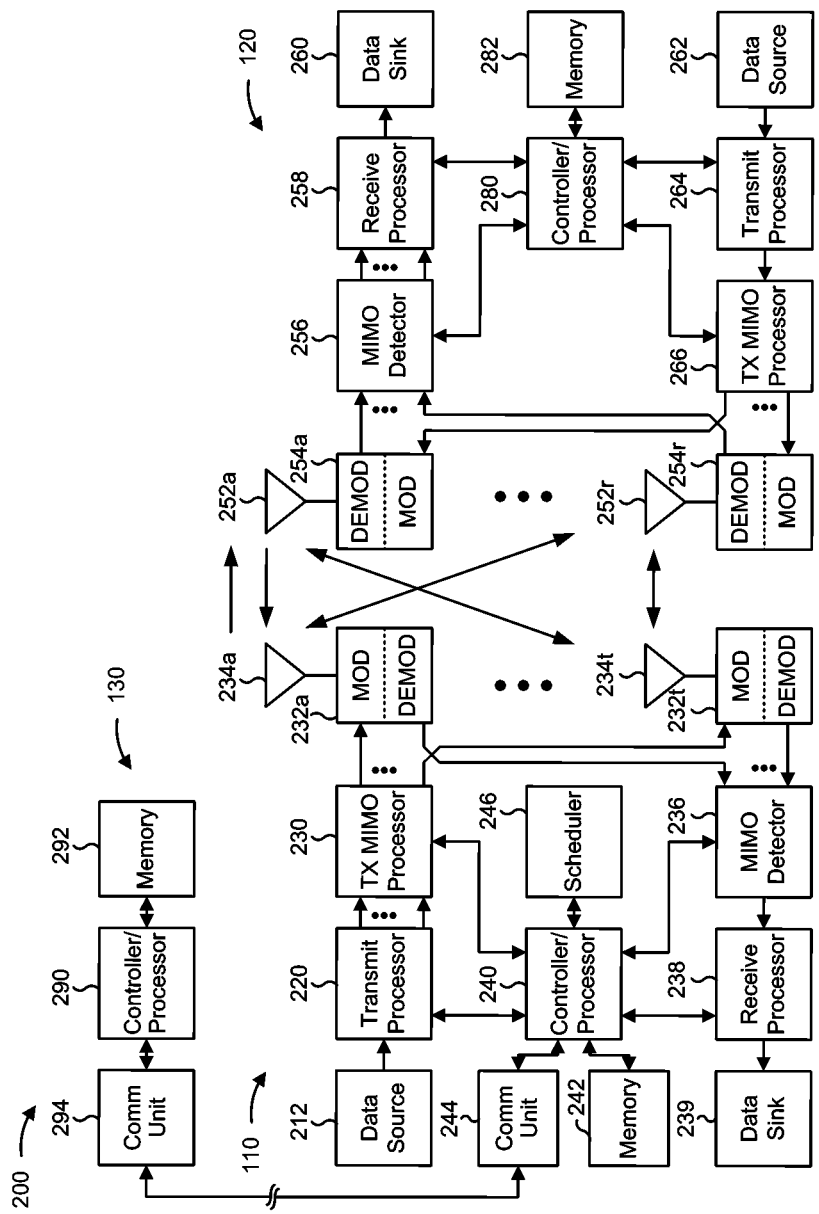
FIG. 2 is a diagram illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate)

the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with contention window adjustment for New Radio unlicensed (NR-U), as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, process 1300 of FIG. 13, process 1400 of FIG. 14, process 1500 of FIG. 15, process 1600 of FIG. 16, process 1700 of FIG. 17, process 1800 of FIG. 18, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 1000 of FIG. 10, process 1100 of FIG. 11, process 1200 of FIG. 12, process 1300 of FIG. 13, process 1400 of FIG. 14, process 1500 of FIG. 15, process 1600 of FIG. 16, process 1700 of FIG. 17, process 1800 of FIG. 18, and/or other processes as described herein. A scheduler 246 may schedule UEs for data transmission on the downlink and/or uplink.

In some aspects, UE 120 may include means for transmitting an uplink communication, associated with a reference hybrid automatic repeat request (HARQ) process, in an uplink burst, means for receiving HARQ feedback after transmitting the uplink communication, means for adjusting a size of a listen before talk (LBT) contention window based at least in part on whether the HARQ feedback is associated with the reference duration, and/or the like. In some aspects, UE 120 may include means for transmitting an uplink communication after performing an LBT procedure during an LBT contention window, means for determining a duration of a HARQ feedback window for receiving HARQ feedback associated with the uplink communication, wherein the duration of the HARQ feedback window is based at least in part on a PUSCH processing time and a PDCCH monitoring occasion configuration, means for selectively adjusting a size of the LBT contention window based at least in part on whether the HARQ feedback is received during the duration of the HARQ feedback window, and/or the like.

In some aspects, UE 120 may include means for initiating an LBT procedure for transmitting an uplink communication, means for receiving, during the LBT procedure, HARQ feedback associated with a previous uplink communication, means for selectively restarting the LBT procedure based at least in part on whether the HARQ feedback was received at a time that satisfies a threshold amount of time prior to an uplink resource for the uplink communication, and/or the like. In some aspects, UE 120 may include means for receiving an indication of a channel access priority threshold, wherein the channel access priority threshold identifies a lowest channel access priority permitted to be used by the UE 120, means for selecting, for an LBT procedure associated with an uplink communication, a channel access priority that satisfies the channel access priority threshold, means for performing the LBT procedure in an LBT contention window, wherein a size of the LBT contention window is based at least in part on the channel access priority, and/or the like.

In some aspects, UE 120 may include means for receiving a first uplink scheduling grant that schedules a first uplink resource for transmission of an uplink communication, wherein the first uplink scheduling grant indicates that the UE is to continue with an LBT procedure for the uplink communication if the LBT procedure does not complete prior to the first uplink resource, means for receiving a second uplink scheduling grant that schedules a second uplink resource for retransmission of the uplink communication, means for transmitting the uplink communication in the second uplink resource after completing the LBT procedure, and/or the like. In some aspects, UE 120 may include means for receiving an indication to initiate an LBT procedure prior to receiving an uplink scheduling grant, means for initiating the LBT procedure based at least in part on receiving the indication, means for receiving the uplink grant while performing the LBT procedure, and/or the like.

In some aspects, UE 120 may include means for receiving an uplink scheduling grant that schedules an uplink resource for transmission of an uplink communication, means for determining that an LBT procedure for the uplink communication will not complete prior to the uplink resource, means for transmitting an indication that the transmission of the uplink communication was not performed based at least in part on determining that the LBT procedure for the uplink communication will not complete prior to the uplink resource, and/or the like.

In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, BS 110 may include means for transmitting, to a UE 120, an uplink scheduling grant that schedules a plurality of consecutive uplink resources, means for identifying a channel access priority associated with the UE 120, means for decoding a first subset of the plurality of consecutive uplink resources based at least in part on determining that an LBT contention window of the UE overlaps with a second subset of the plurality of consecutive uplink resources, and/or the like. In some aspects, BS 110 may include means for transmitting, to a UE 120, a first uplink scheduling grant that schedules a first uplink resource for transmission of an uplink communication, wherein the first uplink scheduling grant indicates that the UE 120 is to continue with LBT procedure for the uplink communication if the LBT procedure does not complete prior to the first uplink resource, means for identifying, based at least in part on an expected time for completion of the LBT procedure, a second uplink resource for retransmission of the uplink communication, means for transmitting, to the UE 120, a second uplink scheduling grant that schedules the second uplink resource, wherein the second uplink scheduling grant indicates that the UE 120 is to refrain from adjusting a size of an LBT contention window of the LBT procedure based at least in part on the second uplink scheduling grant, and/or the like.

In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Some aspects described herein are related to an unlicensed radio frequency spectrum band, which may be used for communications in a wireless network, such as wireless network 100. In some aspects, the unlicensed radio frequency spectrum band may be used by BSs (e.g., BSs 110) and UEs (e.g., UEs 120) of a wireless network for Long Term Evolution (LTE) communications, LTE-Advanced (LTE-A) communications, and/or 5G/NR communications, and by Wi-Fi access points and Wi-Fi stations of a Wi-Fi network for Wi-Fi communications. The unlicensed radio frequency spectrum band may be used in the cellular network in combination with, or independent from, a licensed radio frequency spectrum band, such as in LTE licensed-assisted access (LAA), 5G/NR unlicensed (NR-U), and/or the like. In some examples, the unlicensed radio frequency spectrum band may be a radio frequency spectrum band for which a device may need to contend for access because the radio frequency spectrum band is available, at least in part, for unlicensed use, such as Wi-Fi use.

Prior to transmitting an uplink communication on an unlicensed radio frequency spectrum band, a UE may perform a listen-before-talk (LBT) procedure to contend for access to the unlicensed radio frequency spectrum band. In this case, the UE may contend for access by listening for activity of other UEs on the unlicensed radio frequency spectrum band during an LBT contention window to avoid collisions.

In some cases, the size (e.g., duration) of the LBT contention window may be based at least in part on a channel access priority class (CAPC) associated with the uplink communication and may be adjusted based at least in part on network traffic (e.g., congestion) to permit more opportunities for devices to gain access to the unlicensed radio frequency spectrum band. The UE may analyze hybrid automatic repeat request (HARQ) feedback (e.g., acknowledgement (ACK) or negative acknowledgement (NACK) (ACK/NACK)) associated with prior uplink communications, and may adjust the size of the LBT contention window based at least in part on the HARQ feedback. For example, if a NACK is received (or if no HARQ feedback is received) for a prior uplink communication, the UE may increase the size of the LBT contention window to mitigate congestion. As another example, if an ACK is received for a prior uplink communication, the UE may reset the size of the LBT contention window to a default size.

Various issues may arise in an LBT procedure in an NR-U deployment. For example, a UE may receive HARQ feedback associated with various types of HARQ processes, such as a reference duration, a non-reference duration, and/or the like, and the UE may be unable to determine which type(s) of HARQ processes should be considered when adjusting a size of an LBT contention window. As another example, a UE may be unable to determine how long to monitor for HARQ feedback. In this case, the UE may monitor for HARQ feedback based at least in part on a physical uplink shared channel (PUSCH) processing time of a BS, but if the PUSCH processing time is shorter than a physical downlink control channel (PDCCH) monitoring occasion frequency of the UE, the PUSCH processing time may not allow the BS to provide HARQ feedback before the UE adjusts the size of an LBT contention window. As another example, in some cases, the timing between reception of an uplink scheduling grant and transmission of an associated uplink communication may not permit the UE to perform an LBT procedure for a full LBT contention window and/or may result in the UE being unable to determine whether to adjust a size of an LBT contention window based at least in part on HARQ feedback included in the uplink scheduling grant.

Some aspects described herein provide techniques and apparatuses for contention window adjustment for NR-U. In some aspects, a UE is capable of determining which HARQ processes to consider when adjusting a size of an LBT contention window. In particular, the UE may selectively adjust a size of an LBT contention window based at least in part on whether HARQ feedback is associated with a reference duration of an uplink communication transmitted in an uplink burst. In this way, the UE may refrain from adjusting the size of the LBT contention window based at least in part on HARQ feedback that is associated with non-reference durationes of the uplink burst.

In some aspects, a UE is capable of determining a duration of a HARQ feedback window for receiving HARQ feedback associated with the transmission of an uplink communication. The duration of the HARQ feedback window may be based at least in part on a PUSCH processing of a BS, as well as a PDCCH monitoring occasion configuration and/or discontinuous reception (DRX) operation of the UE. In this way, the duration of a HARQ feedback window may be sized such that the BS is provided with an opportunity to transmit HARQ feedback to the UE (e.g., in a PDCCH monitoring occasion), which permits the UE to adjust a size of an LBT contention window based at least in part on the HARQ feedback.

In some aspects, a UE is capable of determining whether to adjust a size of an LBT contention window based at least in part on when HARQ feedback is received during an LBT procedure for transmitting an uplink communication. For example, the UE and/or a BS may configure a timing threshold between a time at which the HARQ feedback is received and a time at which an uplink resource for the uplink transmission occurs. In this case, the UE may restart the LBT procedure and adjust the size of the LBT contention window if the HARQ feedback is received at a time that satisfies the timing threshold (e.g., if the HARQ feedback is received long enough prior to the uplink resource) or may proceed with the LBT procedure and perform the adjustment for the next LBT procedure if the HARQ feedback is received at a time that does not satisfy the timing threshold (e.g., if the HARQ feedback is received too close in time to the uplink resource).

In some aspects, a BS and/or a UE may be capable of handling uplink scheduling, uplink communication transmission, and/or LBT contention window size adjustment based at least in part on a timing between an uplink scheduling grant and an associated uplink resource for transmitting an uplink communication. In particular, the BS and/or the UE may be capable of handling uplink scheduling, uplink communication transmission, and/or LBT contention window size adjustment in scenarios where the timing between an uplink scheduling grant and an associated uplink resource for transmitting an uplink communication may not allow a UE sufficient time to complete an LBT procedure for the uplink communication. As an example, if the BS determines that some channel access priorities (e.g., a CAPCs) may result in the UE being unable to complete an LBT procedure for an uplink communication, the BS may permit the UE to select a channel access priority for the LBT procedure, such that the size of the LBT contention window either completes prior to the uplink resource for the uplink communication or only partially overlaps with the uplink resource. In this case, the BS may transmit an indication of a channel access priority threshold to the UE, and the UE may select a channel access priority that satisfies the channel access priority threshold.

As another example, the BS may transmit an uplink scheduling grant to the UE that schedules a plurality of consecutive uplink resources (e.g., a multi-transmission time interval (multi-TTI) uplink scheduling grant). In this case, if the timing between the uplink scheduling grant and the plurality of consecutive uplink resources results in an LBT contention window overlapping with a subset of the plurality of consecutive uplink resources, the UE may perform the LBT procedure and may transmit one or more uplink communications in a non-overlapped subset of the plurality of consecutive uplink resources. Moreover, the BS may determine, based at least in part on a channel access priority of the UE (or the uplink communications to be transmitted), that the LBT contention window will overlap with the subset of the plurality of consecutive uplink resources, and accordingly may only decode the non-overlapped subset of the plurality of consecutive uplink resources. In this way, the BS conserves processing and/or memory resources that would have otherwise been consumed on decoding uplink resources in which the UE does not transmit uplink communications (e.g., because the UE is still performing the LBT procedure in these uplink resources).

As another example, the BS may transmit an uplink scheduling grant to the UE, knowing that the UE will not have enough time to complete an LBT procedure prior to transmitting an uplink communication in an uplink resource scheduled by the uplink scheduling grant. In this case, the BS may indicate, in the uplink scheduling grant, that the UE is to continue with the LBT procedure even if the LBT procedure does not complete prior to the uplink resource. Moreover, the BS may transmit another uplink scheduling grant for scheduling another uplink resource in which the UE is to perform a retransmission of the uplink communication. The BS may schedule the uplink resource for the retransmission based at least in part on an expected time for completion of the LBT procedure. In this way, the UE may receive the uplink scheduling grant for the retransmission, may refrain from restarting the LBT procedure or adjusting a size of an LBT contention window of the LBT procedure based at least in part on HARQ feedback in the uplink scheduling grant for the retransmission, and may transmit the uplink communication in the uplink resource scheduled for the retransmission.

As another example, if the BS determines that the UE will not have enough time to complete an LBT procedure prior to transmitting an uplink communication in an uplink resource scheduled by an uplink scheduling grant, the BS may instruct the UE to initiate the LBT procedure prior to transmitting the uplink scheduling grant. In this way, the UE may initiate the LBT procedure earlier in time than if the UE initiated the LBT procedure based at least in part on receiving the uplink scheduling grant, which increases the likelihood that the LBT procedure will complete prior to the uplink resource scheduling by the uplink scheduling grant. Moreover, the UE may refrain from restarting the LBT procedure or adjusting a size of an LBT contention window of the LBT procedure if the UE receives the uplink scheduling grant during the LBT procedure, and if the uplink scheduling grant includes HARQ feedback, which further increases the likelihood that the LBT procedure will complete prior to the uplink resource scheduling by the uplink scheduling grant.

Figure 3:
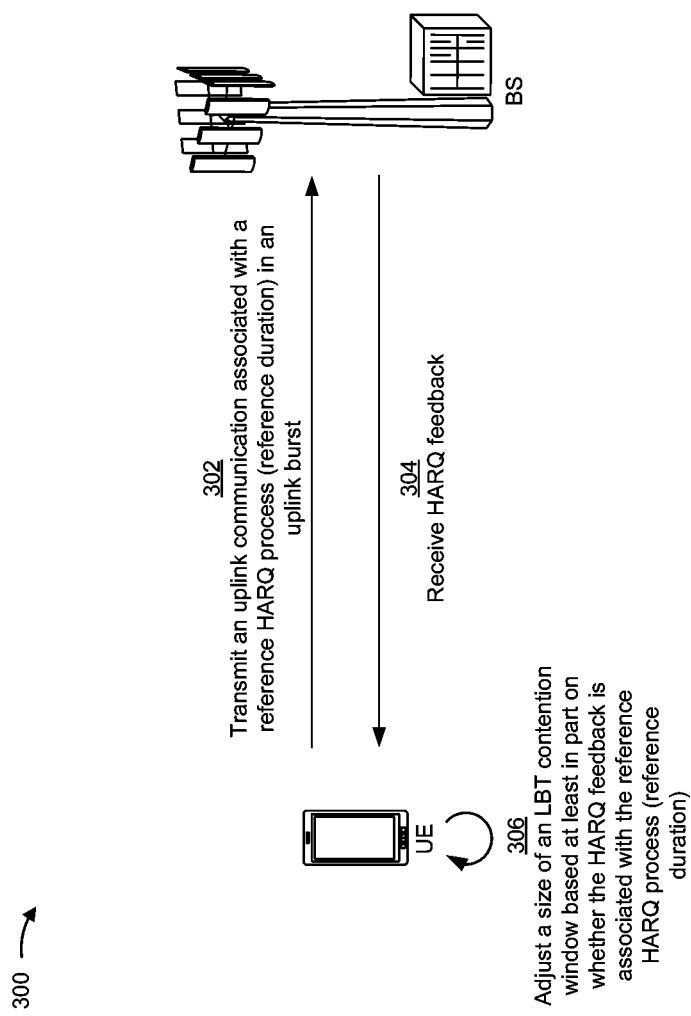
FIGS. 3-9 are diagram illustrating examples of contention window adjustment for New Radio unlicensed, in accordance with various aspects of the present disclosure.

FIG. 3 is a diagram illustrating an example 300 of contention window adjustment for NR-U, in accordance with various aspects of the present disclosure. As shown in FIG. 3, example(s) 300 may include communication between a BS (e.g., BS 110) and a UE (e.g., UE 120). In some aspects, the BS and the UE may be included in a wireless network (e.g., wireless network 100 and/or another wireless network), and may communicate via an access link that includes a downlink and an uplink. In some aspects, the BS and the UE may communicate on an unlicensed radio frequency spectrum band, such as an LAA unlicensed radio frequency spectrum band, an NR-U unlicensed radio frequency spectrum band, and/or the like.

As shown in FIG. 3, and by reference number 302, the UE may transmit an uplink communication (e.g., a PUSCH communication, a physical uplink control channel (PUCCH) communication, and/or the like), associated with a reference HARQ process of the UE, to the BS on the uplink. The BS may schedule an uplink resource for the UE to transmit the uplink communication by transmitting one or more uplink scheduling grants to the UE. Moreover, the BS may transmit HARQ feedback for the communication (e.g., in another one or more uplink scheduling grants, in a dynamic feedback indicator (DFI) communication, and/or the like). In some aspects, the UE may perform an uplink burst, which may include transmitting a plurality of uplink communications across a plurality of slots. In this case, each of the plurality of uplink communications may be associated with a HARQ process.

An uplink burst may be associated with various types of HARQ processes, such as a reference HARQ process, a non-reference HARQ process, and/or the like. A reference HARQ process may include a HARQ process associated with an uplink transmission transmitted during a reference duration (such as a reference subframe) of a channel occupancy time (COT) associated with the UE. A non-reference HARQ process may include all other HARQ processes that are not reference HARQ processes. The uplink communication transmitted by the UE may be associated with the reference HARQ process in that the uplink communication is transmitted during the reference duration (e.g., the reference subframe). The uplink communication may be a reference uplink transmission, which may include a first uplink transmission in a first non-punctured slot of the uplink burst or a last reference uplink transmission in the uplink burst. Uplink communications that are transmitted outside of the reference duration (e.g., after the reference duration) may be associated with non-reference HARQ processes.

In some aspects, the UE may transmit the uplink communication after performing an LBT procedure for the uplink communication. For example, the UE may receive an uplink scheduling grant that schedules an uplink resource for the uplink communication, may perform the LBT procedure for the uplink communication to contend for access to radio resources on the unlicensed radio frequency spectrum band, and may determine that the radio resources are available based at least in part on performing the LBT procedure for a duration of an LBT contention window.

As further shown in FIG. 3, and by reference number 304, the UE may receive HARQ feedback from the BS after transmitting the uplink communication. In some aspects, the UE may receive the HARQ feedback in another uplink scheduling grant that schedules an uplink resource for transmission of another uplink communication or for retransmission of the uplink communication. In some aspects, the UE may receive the HARQ feedback in a DFI communication.

The HARQ feedback may include an ACK for the uplink communication (e.g., that indicates that the uplink communication was successfully decoded) or a NACK for the uplink communication (e.g., that indicates that the uplink communication was not successfully decoded). In some aspects, if the HARQ feedback is received in an uplink scheduling grant, the uplink scheduling grant may include a new data indicator (NDI) field that indicates whether the uplink scheduling grant is for transmission of new data. In this case, the NDI field may indicate that the UE is to transmit a new uplink communication, which may be interpreted by the UE as an ACK for the uplink communication, or that the UE is to retransmit a previous uplink communication, which may be interpreted by the UE as a NACK for the uplink communication.

As further shown in FIG. 3, and by reference number 306, the UE may selectively adjust a size of the LBT contention window (e.g., for a subsequent LBT procedure, for an in-progress LBT procedure, and/or the like) based at least in part on whether the HARQ feedback received from the BS is associated with the reference HARQ process (e.g., associated with the reference duration). For example, if the UE determines that the HARQ feedback is not associated with the reference HARQ process (e.g., is not associated with the reference duration and/or is associated with a non-reference HARQ process, which may be associated with another uplink communication transmitted in the uplink burst), the UE may refrain from adjusting the size of the LBT contention window. In this way, HARQ feedback for non-reference HARQ processes are disregarded by the UE, and only HARQ feedback for reference HARQ processes are considered for LBT contention window adjustment.

As described, above the reference HARQ process is associated with a reference duration (e.g., a reference subframe). Thus, the HARQ feedback for the uplink communication is associated with the reference HARQ process if the uplink communication was transmitted during the reference duration such that the uplink communication is associated with the reference HARQ process. HARQ feedback for other uplink communications transmitted outside of the reference duration may be associated with non-HARQ processes.

In some aspects, if the UE determines that the HARQ feedback is associated with the reference HARQ process (e.g., the HARQ feedback is associated with an uplink communication transmitted in a reference duration, the UE may determine whether the HARQ feedback is an ACK or a NACK, and may adjust the size of the LBT contention window based at least in part on determining whether the HARQ feedback is an ACK or a NACK. For example, if the UE determines that the HARQ feedback is a NACK, the UE may increase the size of the LBT contention window (e.g., may double the size of the LBT contention window and/or may increase the size of the LBT contention window in another incremental value). In some aspects, the UE may continue to increment the size of the LBT contention window for each NACK received for the reference HARQ process (or the reference duration) until an ACK is received. If the UE determines that the HARQ feedback is an ACK, the UE may reset the size of the LBT contention window to a default LBT contention window size.

In this way, the UE is capable of determining which HARQ processes to consider when adjusting a size of an LBT contention window. In particular, the UE may selectively adjust a size of an LBT contention window based at least in part on whether HARQ feedback is associated with a reference HARQ process of an uplink communication transmitted in an uplink burst. In this way, the UE may refrain from adjusting the size of the LBT contention window based at least in part on HARQ feedback that is associated with non-reference HARQ processes of the uplink burst.

As indicated above, FIG. 3 is provided as one or more examples. Other examples may differ from what is described with respect to FIG. 3.

Figure 4:
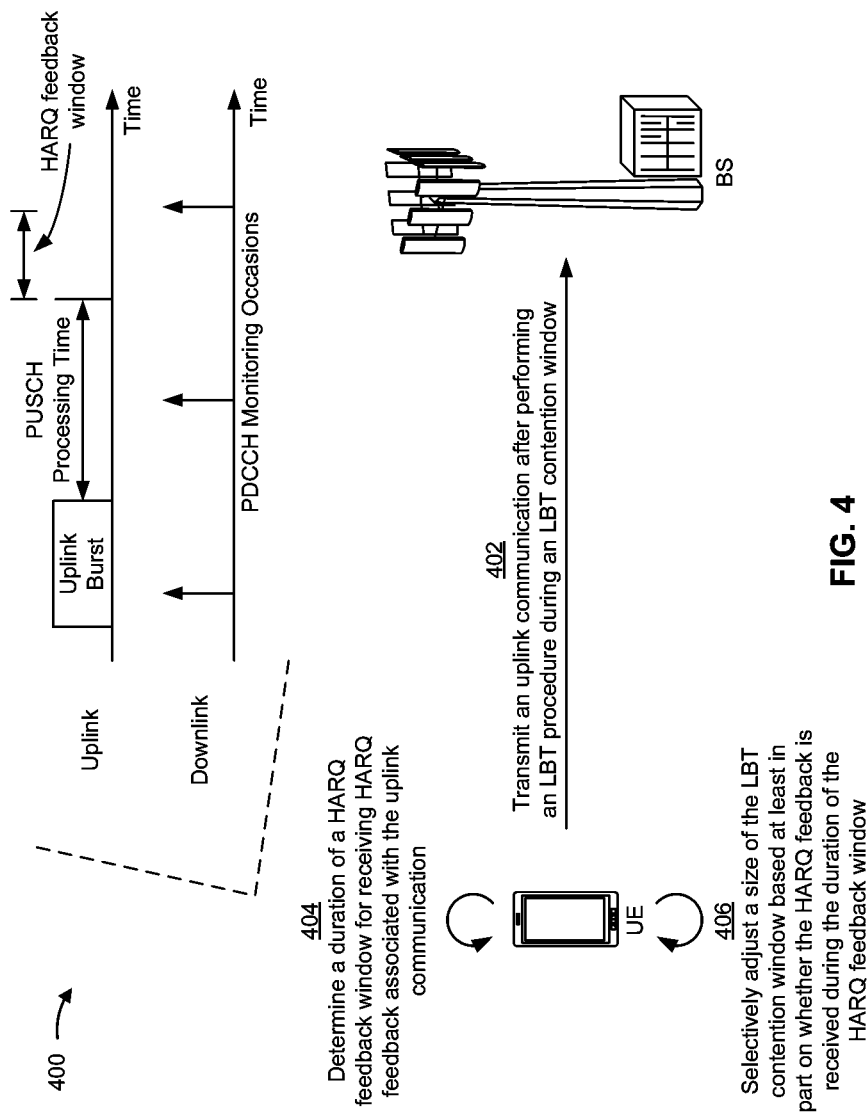

FIG. 4 is a diagram illustrating an example 400 of contention window adjustment for NR-U, in accordance with various aspects of the present disclosure. As shown in FIG. 4, example(s) 400 may include communication between a BS (e.g., BS 110) and a UE (e.g., UE 120). In some aspects, the BS and the UE may be included in a wireless network (e.g., wireless network 100 and/or another wireless network), and may communicate via an access link that includes a downlink and an uplink. In some aspects, the BS and the UE may communicate on an unlicensed radio frequency spectrum band, such as an LAA unlicensed radio frequency spectrum band, an NR-U unlicensed radio frequency spectrum band, and/or the like.

As shown in FIG. 4, and by reference number 402, the UE may transmit an uplink communication (e.g., a PUSCH communication, a PUCCH communication, and/or the like) to the BS on the uplink. The BS may schedule an uplink resource for the UE to transmit the uplink communication by transmitting one or more uplink scheduling grants to the UE. Moreover, the BS may transmit HARQ feedback for the communication (e.g., in another one or more uplink scheduling grants, in a DFI communication, and/or the like). In some aspects, the UE may perform an uplink burst, which may include transmitting a plurality of uplink communications across a plurality of slots. In this case, each of the plurality of uplink communications may be associated with a HARQ process.

In some aspects, the UE may transmit the uplink communication after performing an LBT procedure for the uplink communication during an LBT contention window. For example, the UE may receive an uplink scheduling grant that schedules an uplink resource for the uplink communication, may perform the LBT procedure for the uplink communication to contend for access to radio resources on the unlicensed radio frequency spectrum band, and may determine that the radio resources are available based at least in part on performing the LBT procedure for a duration of the LBT contention window.

As further shown in FIG. 4, and by reference number 404, the UE may determine a duration of a HARQ feedback window for receiving, from the BS, HARQ feedback associated with the uplink communication. In some aspects, the duration of the HARQ feedback window, the starting symbol of the HARQ feedback window, and/or the like may be determined such that the BS is given an opportunity to provide the HARQ feedback in a PDCCH monitoring occasion of the UE.

To ensure that the BS is given an opportunity to provide the HARQ feedback to the UE, the duration of the HARQ feedback window may be based at least in part on a PUSCH processing time of the BS and a PDCCH monitoring occasion configuration of the UE. As shown in FIG. 4, the PDCCH monitoring occasion configuration of the UE may include a periodicity or frequency of PDCCH monitoring occasions for monitoring for PDCCH communications from the BS.

As further shown in FIG. 4, the PUSCH processing time may include a time duration, from reception at the BS of the uplink communication in an uplink burst, for the BS to process the uplink communication and determine the HARQ feedback for the uplink communication. In some aspects, the PUSCH processing time may vary from BS to BS, in which case the BS may transmit an indication of the PUSCH processing time of the BS to the UE in a downlink communication (e.g., a downlink control information (DCI) communication, a medium access control element (MAC-CE) communication, a radio resource control (RRC) communication, and/or the like). In some aspects, the PUSCH processing time may correspond to, and may be indicated by, a DFI validity timer of the BS, a HARQ roundtrip time (RTT) timer of the BS, and/or the like.

In some aspects, the BS may transmit an indication of the duration of the HARQ feedback window to the UE in a downlink communication (e.g., a DCI communication, a MAC-CE communication, an RRC communication, and/or the like), and the UE may determine the duration of the HARQ feedback window based at least in part on the indication. In some aspects, the UE may determine the duration of the HARQ feedback window based at least in part on the indication of the PUSCH processing time of the BS and based at least in part on the PDCCH monitoring occasion configuration of the UE. In some aspects, the indication of the HARQ feedback window may include an indication of a duration of a DRX retransmission timer of the UE. For example, the duration of the HARQ feedback window corresponds to a duration of a DRX retransmission timer associated with a reference uplink transmission of the uplink burst in which the uplink communication was transmitted.

To determine the duration of the HARQ feedback window, the UE may determine a starting symbol and an ending symbol of the HARQ feedback window. In some aspects, the UE may determine the starting symbol of the HARQ feedback window to be the next symbol after expiration of the PUSCH processing time of the BS. In some aspects, the UE may determine the ending symbol of the HARQ feedback window to be the ending symbol of the next PDCCH monitoring occasion that occurs after expiration of the PUSCH processing time or a PDCCH monitoring occasion that occurs a threshold number of slots and/or symbols after expiration of the PUSCH processing time. The reference uplink transmission may be a last reference uplink transmission in the uplink burst or a first reference uplink transmission in the uplink burst.

In some aspects, the UE may determine the duration of the HARQ feedback window further based at least in part on DRX operation of the UE. For example, the UE may determine the ending symbol of the HARQ feedback window to be the ending symbol of the next PDCCH monitoring occasion that occurs after expiration of the PUSCH processing time and that occurs during a DRX on duration of the UE.

In some aspects, the UE may monitor for, and may receive, HARQ feedback for the uplink communication in the duration of the HARQ feedback window. In some aspects, the UE may monitor for the HARQ feedback during the duration of the HARQ feedback window in a same cell of the BS in which the uplink communication was transmitted, in a difference cell of the BS and/or another BS than the cell in which the uplink communication was transmitted.

As further shown in FIG. 4, and by reference number 406, the UE may selectively adjust a size of the LBT contention window (e.g., for a subsequent LBT procedure, for an in-progress LBT procedure, and/or the like) based at least in part on whether the HARQ feedback was received from the BS during the duration of the HARQ feedback window. For example, if the UE determines that no HARQ feedback was received in the duration of the HARQ feedback window, the UE may increase the size of the LBT contention window (e.g., may double the size of the LBT contention window and/or may increase the size of the LBT contention window in another incremental value).

If the UE determines that the HARQ feedback was received during the duration of the HARQ feedback window, the UE may determine whether the adjust the size of the LBT contention window based at least in part on the HARQ feedback. For example, the UE may determine whether the HARQ feedback is an ACK or a NACK, and may adjust the size of the LBT contention window based at least in part on determining whether the HARQ feedback is an ACK or a NACK. If the UE determines that the HARQ feedback is a NACK, the UE may increase the size of the LBT contention window (e.g., may double the size of the LBT contention window and/or may increase the size of the LBT contention window in another incremental value). In some aspects, the UE may continue to increment the size of the LBT contention window for each NACK received until an ACK is received. If the UE determines that the HARQ feedback is an ACK, the UE may reset the size of the LBT contention window to a default LBT contention window size.

In this way, the HARQ feedback window may be based at least in part on a PUSCH processing of a BS, as well as a PDCCH monitoring occasion configuration and/or DRX operation of the UE. In this way, the duration of a HARQ feedback window may be sized such that the BS is provided with an opportunity to transmit HARQ feedback to the UE (e.g., in a PDCCH monitoring occasion), which permits the UE to adjust a size of an LBT contention window based at least in part on the HARQ feedback.

As indicated above, FIG. 4 is provided as one or more examples. Other examples may differ from what is described with respect to FIG. 4.

Figure 5:
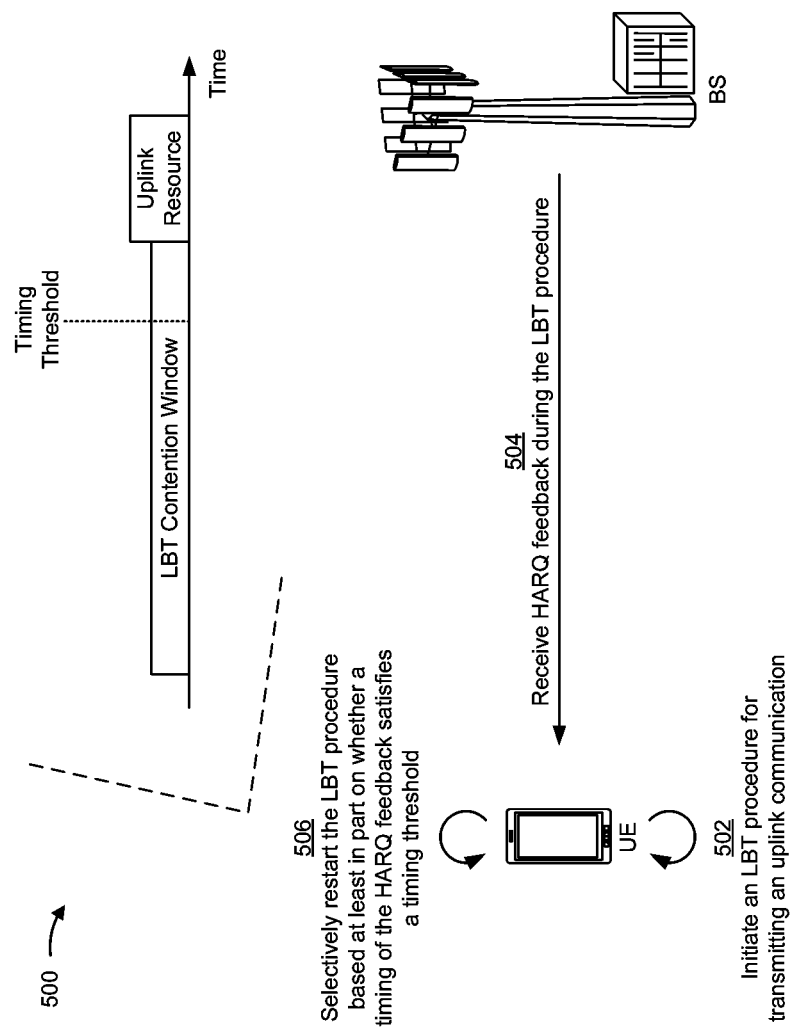

FIG. 5 is a diagram illustrating an example 500 of contention window adjustment for NR-U, in accordance with various aspects of the present disclosure. As shown in FIG. 5, example(s) 500 may include communication between a BS (e.g., BS 110) and a UE (e.g., UE 120). In some aspects, the BS and the UE may be included in a wireless network (e.g., wireless network 100 and/or another wireless network), and may communicate via an access link that includes a downlink and an uplink. In some aspects, the BS and the UE may communicate on an unlicensed radio frequency spectrum band, such as an LAA unlicensed radio frequency spectrum band, an NR-U unlicensed radio frequency spectrum band, and/or the like.

In some aspects, the UE may transmit an uplink communication (e.g., a PUSCH communication, a PUCCH communication, and/or the like) to the BS on the uplink. The BS may schedule an uplink resource for the UE to transmit the uplink communication by transmitting one or more uplink scheduling grants to the UE. Moreover, the BS may transmit HARQ feedback for the communication (e.g., in another one or more uplink scheduling grants, in a DFI communication, and/or the like). In some aspects, the UE may perform an uplink burst, which may include transmitting a plurality of uplink communications across a plurality of slots. In this case, each of the plurality of uplink communications may be associated with a HARQ process.

In some aspects, the UE may transmit the uplink communication after performing an LBT procedure for the uplink communication during an LBT contention window. As shown in FIG. 5, and by reference number 502, the UE may receive an uplink scheduling grant that schedules an uplink resource for the uplink communication and may initiate the LBT procedure for the uplink communication to contend for access to radio resources on the unlicensed radio frequency spectrum band. The UE may perform the LBT procedure during an LBT contention window.

As further shown in FIG. 5, and by reference number 504, the UE may monitor for, and may receive, HARQ feedback for the uplink communication during the LBT procedure (e.g., may receive the HARQ feedback at a time prior to completion of the LBT procedure). In some aspects, the HARQ feedback may be included in an uplink scheduling grant that schedules an uplink resource in which the UE is to transmit another uplink communication.

As further shown in FIG. 5, and by reference number 506, the UE may selectively restart the LBT procedure based at least in part on whether the timing of the HARQ feedback satisfies a timing threshold. In some aspects, the UE may determine the timing threshold. In some aspects, the BS may transmit an indication of the timing threshold to the UE.

The timing threshold may correspond to an amount of time prior to an uplink resource in which the UE is to transmit the uplink communication. In this case, the UE may determine whether the timing of the HARQ feedback satisfies a timing threshold by determining whether the HARQ feedback was received at a time that satisfies the threshold amount of time.

In some aspects, the uplink resource may be a single resource. In some aspects, the uplink resource may be an uplink resource among a plurality of consecutive uplink resources scheduled by the BS. In this case, the threshold amount of time may be based at least in part on the first uplink resource in the plurality of consecutive uplink resources, may be based at least in part on the last uplink resource in the plurality of consecutive uplink resources, or may be based on another uplink resource in the plurality of consecutive uplink resources.

In some aspects, the timing threshold, and thus the threshold amount of time, may be based at least in part on a channel access priority (e.g., a CAPC) associated with the UE and/or the uplink communication. In this case, the timing threshold, and thus the threshold amount of time, may be based at least in part on a size of the LBT contention window. In some aspects, the timing threshold, and thus the threshold amount of time, may be based at least in part on an unadjusted size of the LBT contention window (e.g., based at least in part on the size of the LBT contention window without adjusting the size based at least in part on the HARQ feedback). In some aspects, the timing threshold, and thus the threshold amount of time, may be based at least in part on an adjusted size of the LBT contention window (e.g., based at least in part on the size that the LBT contention window would be if adjusted based at least in part on the HARQ feedback).

In some aspects, the timing threshold, and thus the threshold amount of time, may be based at least in part on an unadjusted LBT counter associated with the LBT procedure (e.g., based at least in part on a randomly selected value that determines the LBT channel sensing duration within an upper and lower bound for the LBT contention window). In some aspects, the timing threshold, and thus the threshold amount of time, may be based at least in part on an adjusted LBT counter associated with the LBT procedure (e.g., based at least in part on a newly selected randomly value based at least in part on the HARQ feedback).

In some aspects, the timing threshold may be indicated to the UE by the BS in a downlink signaling communication (e.g., in a DCI communication, an RRC communication, a MAC-CE communication, and/or the like), in system information (e.g., a system information block, a master information block, a synchronization signal block, and/or the like), and/or the like. In some aspects, the timing threshold may be hard coded or configured at the UE.

In some aspects, the UE may restart the LBT procedure based at least in part on determining that the HARQ feedback was received at a time that satisfies the timing threshold. For example, the UE may determine that the HARQ feedback was received at least the threshold amount of time prior to the uplink resource for the uplink communication. In this case, the UE may determine that there is a sufficient amount of time to restart the LBT procedure and to adjust the size of the LBT contention window (e.g., based at least in part on the HARQ feedback) prior to restarting the LBT procedure.

In some aspects, the UE may proceed with the LBT procedure (e.g., may refrain from restarting the LBT procedure) based at least in part on determining that the HARQ feedback was received at a time that does not satisfy the timing threshold. For example, the UE may determine that the HARQ feedback was not received at least the threshold amount of time prior to the uplink resource for the uplink communication. In this case, the UE may determine that there is not sufficient time to restart the LBT procedure, and may therefore proceed with the LBT procedure. Moreover, the UE may adjust the size of the LBT contention window for a subsequent LBT procedure based at least in part on the HARQ feedback.

In some aspects, the UE may selectively adjust a size of the LBT contention window (e.g., for a subsequent LBT procedure, for a restarted LBT procedure, and/or the like) based at least in part on whether the HARQ feedback is an ACK or a NACK. If the UE determines that the HARQ feedback is a NACK, the UE may increase the size of the LBT contention window (e.g., may double the size of the LBT contention window and/or may increase the size of the LBT contention window in another incremental value). In some aspects, the UE may continue to increment the size of the LBT contention window for each NACK received until an ACK is received. If the UE determines that the HARQ feedback is an ACK, the UE may reset the size of the LBT contention window to a default LBT contention window size.

In this way, the UE is capable of determining whether to adjust a size of an LBT contention window based at least in part on when HARQ feedback is received during an LBT procedure for transmitting an uplink communication. For example, the UE and/or a BS may configure a timing threshold between a time at which the HARQ feedback is received and a time at which an uplink resource for the uplink transmission occurs. In this case, the UE may restart the LBT procedure and adjust the size of the LBT contention window if the HARQ feedback is received at a time that satisfies the timing threshold (e.g., if the HARQ feedback is received long enough prior to the uplink resource) or may proceed with the LBT procedure and perform the adjustment for the next LBT procedure if the HARQ feedback is received at a time that does not satisfy the timing threshold (e.g., if the HARQ feedback is received too close in time to the uplink resource).

As indicated above, FIG. 5 is provided as one or more examples. Other examples may differ from what is described with respect to FIG. 5.

Figure 6:
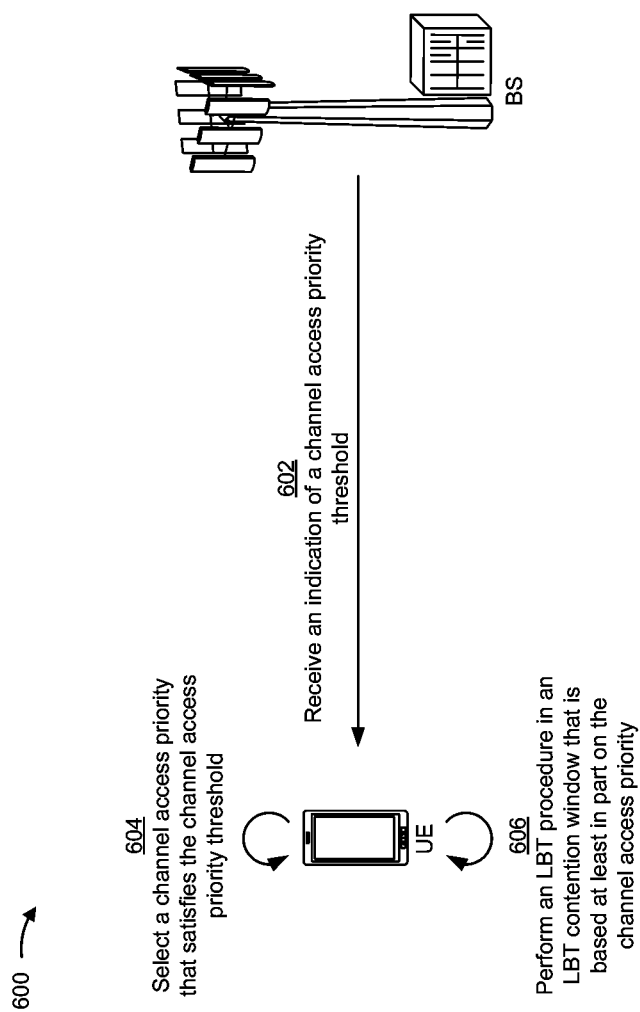

FIG. 6 is a diagram illustrating an example 600 of contention window adjustment for NR-U, in accordance with various aspects of the present disclosure. As shown in FIG. 6, example(s) 600 may include communication between a BS (e.g., BS 110) and a UE (e.g., UE 120). In some aspects, the BS and the UE may be included in a wireless network (e.g., wireless network 100 and/or another wireless network), and may communicate via an access link that includes a downlink and an uplink. In some aspects, the BS and the UE may communicate on an unlicensed radio frequency spectrum band, such as an LAA unlicensed radio frequency spectrum band, an NR-U unlicensed radio frequency spectrum band, and/or the like.

In some aspects, the UE may transmit an uplink communication (e.g., a PUSCH communication, a PUCCH communication, and/or the like) to the BS on the uplink. The BS may schedule an uplink resource for the UE to transmit the uplink communication by transmitting one or more uplink scheduling grants to the UE. Moreover, the BS may transmit HARQ feedback for the communication (e.g., in another one or more uplink scheduling grants, in a DFI communication, and/or the like). In some aspects, the UE may perform an uplink burst, which may include transmitting a plurality of uplink communications across a plurality of slots. In this case, each of the plurality of uplink communications may be associated with a HARQ process.

In some aspects, the UE may transmit the uplink communication after performing an LBT procedure for the uplink communication during an LBT contention window. As shown in FIG. 6, and by reference number 602, the UE may receive an indication of a channel access priority threshold (e.g., a CAPC threshold) for the uplink communication. The channel access priority threshold may indicate to the UE which channel access priorities (e.g., CAPCs) are permitted to be selected by the UE for performing the LBT procedure.

In some aspects, the BS may transmit the indication of the channel access priority threshold to the UE based at least in part on determining that some (e.g., lower) channel access priorities may result in too large of a size of the LBT contention window for the LBT procedure. In this case, if the UE selects a channel access priority that does not satisfy the channel access priority threshold, the size of the LBT contention window (e.g., which is based at least in part on the selected channel access priority) may result in the UE being unable to complete the LBT procedure prior to the uplink resource scheduled for transmission of the uplink communication, which may result in the UE being unable to transmit the uplink communication. Accordingly, the channel access priority threshold permits the UE to select the data, associated with a sufficiently high channel access priority, to be transmitted in the uplink communication.

As further shown in FIG. 6, and by reference number 604, the UE may select a channel access priority that satisfies the channel access priority threshold for the uplink communication. In this case, the UE may select data to be transmitted in the uplink communication that is associated with a channel access priority that satisfies the channel access priority threshold.

As further shown in FIG. 6, and by reference number 606, the UE may perform an LBT procedure, for the uplink communication, in an LBT contention window that is based at least in part on the selected channel access priority. For example, the duration of the LBT contention window may be sized based at least in part on the selected channel access priority.

In this way, if the BS determines that some channel access priorities (e.g., a CAPCs) may result in the UE being unable to complete an LBT procedure for an uplink communication, the BS may permit the UE to select a channel access priority for the LBT procedure, such that the size of the LBT contention window either completes prior to the uplink resource for the uplink communication or only partially overlaps with the uplink resource. In this case, the BS may transmit an indication of a channel access priority threshold to the UE, and the UE may select a channel access priority that satisfies the channel access priority threshold.

As indicated above, FIG. 6 is provided as one or more examples. Other examples may differ from what is described with respect to FIG. 6.

Figure 7:
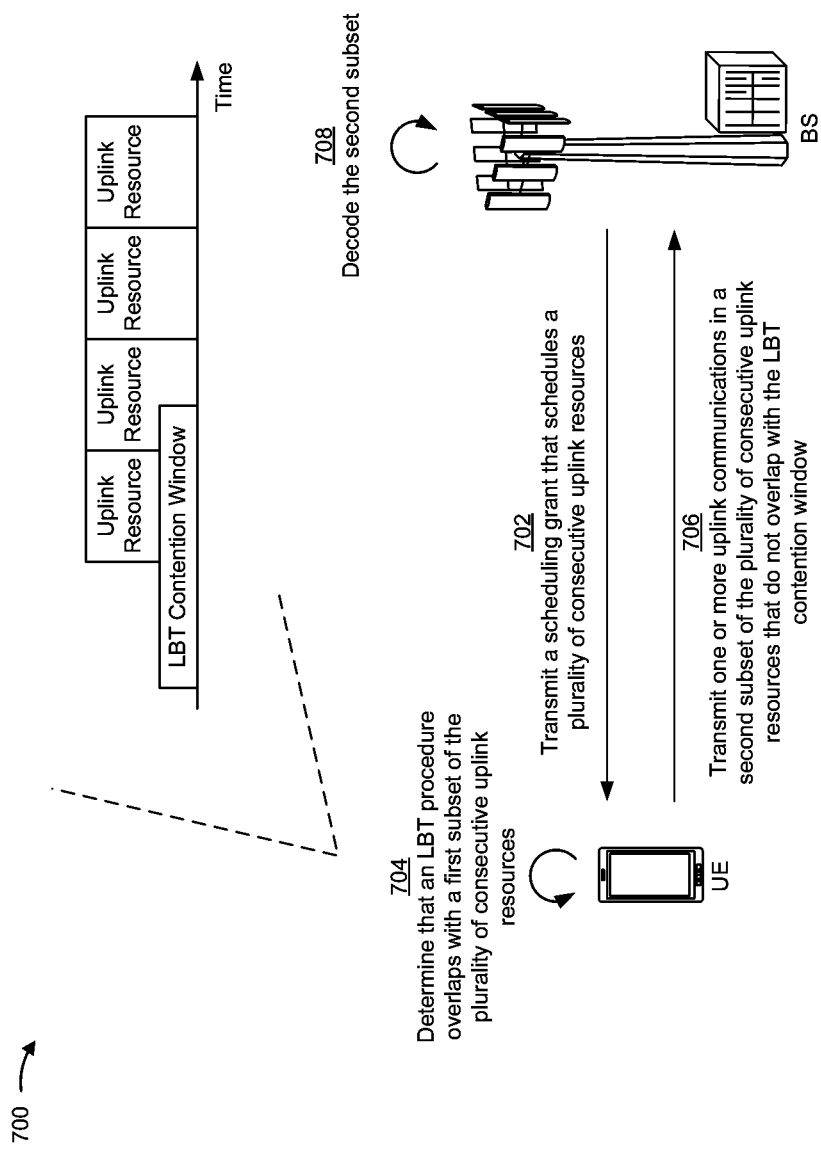

FIG. 7 is a diagram illustrating an example 700 of contention window adjustment for NR-U, in accordance with various aspects of the present disclosure. As shown in FIG. 7, example(s) 700 may include communication between a BS (e.g., BS 110) and a UE (e.g., UE 120). In some aspects, the BS and the UE may be included in a wireless network (e.g., wireless network 100 and/or another wireless network), and may communicate via an access link that includes a downlink and an uplink. In some aspects, the BS and the UE may communicate on an unlicensed radio frequency spectrum band, such as an LAA unlicensed radio frequency spectrum band, an NR-U unlicensed radio frequency spectrum band, and/or the like.

In some aspects, the UE may transmit one or more uplink communications (e.g., one or more PUSCH communications, one or more PUCCH communications, and/or the like) to the BS on the uplink. As shown in FIG. 7, and by reference number 702, the BS may schedule a plurality of consecutive uplink resources for the UE to transmit the one or more uplink communications by transmitting an uplink scheduling grant to the UE. In some aspects, the BS may schedule the plurality of consecutive uplink resources via a multi-TTI uplink scheduling grant. In some aspects, the UE may receive the scheduling grant and may perform an LBT procedure during an LBT contention window for transmitting the one or more uplink communications.

As further shown in FIG. 7, and by reference number 704, the UE may determine that the LBT procedure overlaps with a first subset of the plurality of consecutive uplink resources. For example, the UE may determine that the LBT procedure overlaps with the first subset of the plurality of consecutive uplink resources based at least in part on a time duration between reception of the uplink scheduling grant and the starting time of the plurality of consecutive uplink resources, based at least in part on a size of the LBT contention window, and/or the like.

As further shown in FIG. 7, and by reference number 706, the UE may transmit the one or more uplink communications, or a subset thereof, in a second subset of the plurality of consecutive uplink resources that do not overlap with the LBT contention window of the LBT procedure. In this way, the UE may complete the LBT procedure in the time-domain resources scheduled for the first subset of the plurality of consecutive uplink resources, and may proceed with transmitting the one or more uplink communications in the second subset of the plurality of consecutive uplink resources.

As further shown in FIG. 7, and by reference number 708, the BS may decode the second subset of resources. The BS may decode the second subset of the plurality of consecutive uplink resources based at least in part on determining that the LBT contention window of the LBT procedure will overlap with the first subset of the plurality of consecutive uplink resources. The BS may determine that the LBT contention window of the LBT procedure will overlap with the first subset of the plurality of consecutive uplink resources based at least in part on determining the size of the LBT contention window (e.g., based at least in part on determining the channel access priority (e.g., CAPC) of the one or more uplink communications), based at least in part on a timing between the uplink scheduling grant and the plurality of the consecutive uplink resources, and/or the like.

In this way, if the timing between the uplink scheduling grant and the plurality of consecutive uplink resources results in an LBT contention window that overlaps with a subset of the plurality of consecutive uplink resources, the UE may perform the LBT procedure and may transmit one or more uplink communications in a non-overlapped subset of the plurality of consecutive uplink resources. Moreover, the BS may determine, based at least in part on a channel access priority of the UE (or the uplink communications to be transmitted), that the LBT contention window will overlap with the subset of the plurality of consecutive uplink resources, and accordingly may only decode the non-overlapped subset of the plurality of consecutive uplink resources. In this way, the BS conserves processing and/or memory resources that would have otherwise been consumed on decoding uplink resources in which the UE does not transmit uplink communications (e.g., because the UE is still performing the LBT procedure in these uplink resources).

As indicated above, FIG. 7 is provided as one or more examples. Other examples may differ from what is described with respect to FIG. 7.

Figure 8:
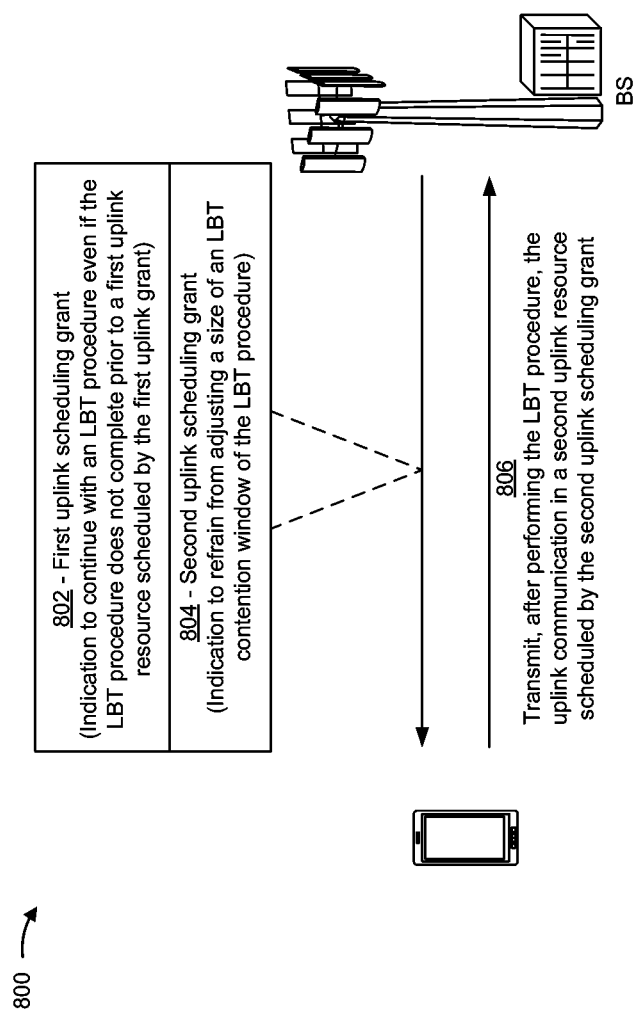

FIG. 8 is a diagram illustrating an example 800 of contention window adjustment for NR-U, in accordance with various aspects of the present disclosure. As shown in FIG. 8, example(s) 800 may include communication between a BS (e.g., BS 110) and a UE (e.g., UE 120). In some aspects, the BS and the UE may be included in a wireless network (e.g., wireless network 100 and/or another wireless network), and may communicate via an access link that includes a downlink and an uplink. In some aspects, the BS and the UE may communicate on an unlicensed radio frequency spectrum band, such as an LAA unlicensed radio frequency spectrum band, an NR-U unlicensed radio frequency spectrum band, and/or the like.

In some aspects, the UE may transmit an uplink communication (e.g., a PUSCH communication, a PUCCH communication, and/or the like) to the BS on the uplink. As shown in FIG. 8, and by reference number 802, the BS may schedule a first uplink resource for the UE to transmit the uplink communication by transmitting a first uplink scheduling grant to the UE. In some aspects, the UE may receive the first scheduling grant and may perform an LBT procedure during an LBT contention window for transmitting the one or more uplink communications. The UE may perform an LBT procedure for the uplink communication to contend for radio resources on the unlicensed radio frequency spectrum band for transmitting the uplink communication in the first uplink resource.

In some aspects, the BS may configure the first uplink scheduling grant to include an indication that the UE is to continue with the LBT procedure for the uplink communication even if the LBT procedure does not complete prior to the occurrence of the uplink resource.

As further shown in FIG. 8, and by reference number 804, the BS may subsequently transmit a second uplink scheduling grant to the UE. The second uplink scheduling grant may schedule a second uplink resource for retransmission of the uplink communication. In some aspects, the BS may transmit the second uplink scheduling grant based at least in part on determining that the UE will not complete LBT procedure for the uplink communication prior to the occurrence of the first uplink resource.

In some aspects, the BS may determine that the UE will not complete LBT procedure for the uplink communication prior to the occurrence of the first uplink resource based at least in part on a timing between the transmission of the first uplink scheduling grant and the first uplink resource, based at least in part on a channel access priority (e.g., a channel access priority class (CAPC) or another type of channel access priority) of the UE and/or the uplink communication (which may determine the size of the LBT contention window of the LBT procedure), and/or the like. In this way, the UE may proceed with the LBT procedure and transmit the uplink communication in the second uplink resource after completing the LBT procedure.

The UE may receive the second uplink scheduling grant while performing the LBT procedure. The UE may proceed with the LBT procedure based at least in part on the indication in the first uplink scheduling grant. In some aspects, the second uplink scheduling grant may include an indication to refrain from adjusting the size of the LBT contention window of the LBT procedure based at least in part on HARQ feedback included in the second uplink scheduling grant.

As further shown in FIG. 8, and by reference number 806, the UE may transmit, after performing and completing the LBT procedure, the uplink communication in the second uplink resource scheduling by the second uplink scheduling grant. In some aspects, the UE may adjust the size of the LBT contention window for one or more subsequent LBT procedures based at least in part on the HARQ feedback included in the second uplink scheduling grant.

In this way, the BS may transmit an uplink scheduling grant to the UE, knowing that the UE will not have enough time to complete an LBT procedure prior to transmitting an uplink communication in an uplink resource scheduled by the uplink scheduling grant. In this case, the BS may indicate, in the uplink scheduling grant, that the UE is to continue with the LBT procedure even if the LBT procedure does not complete prior to the uplink resource. Moreover, the BS may transmit another uplink scheduling grant for scheduling another uplink resource in which the UE is to perform a retransmission of the uplink communication. The BS may schedule the uplink resource for the retransmission based at least in part on an expected time for completion of the LBT procedure. In this way, the UE may receive the uplink scheduling grant for the retransmission, may refrain from restarting the LBT procedure or adjusting a size of an LBT contention window of the LBT procedure based at least in part on HARQ feedback in the uplink scheduling grant for the retransmission, and may transmit the uplink communication in the uplink resource scheduled for the retransmission.

As indicated above, FIG. 8 is provided as one or more examples. Other examples may differ from what is described with respect to FIG. 8.

Figure 9:
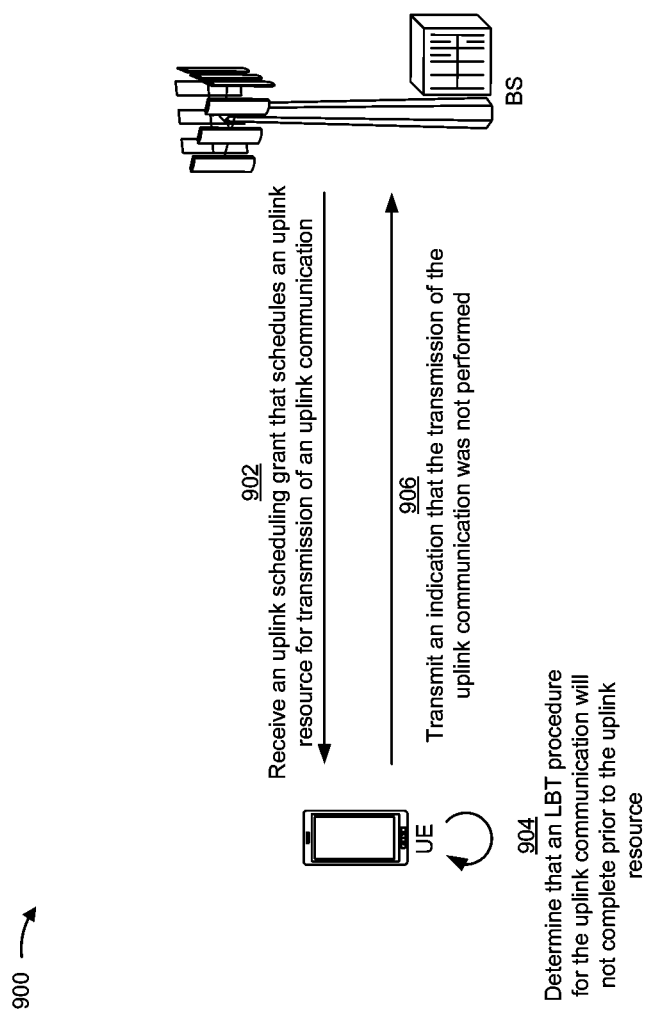

FIG. 9 is a diagram illustrating an example 900 of contention window adjustment for NR-U, in accordance with various aspects of the present disclosure. As shown in FIG. 9, example(s) 900 may include communication between a BS (e.g., BS 110) and a UE (e.g., UE 120). In some aspects, the BS and the UE may be included in a wireless network (e.g., wireless network 100 and/or another wireless network), and may communicate via an access link that includes a downlink and an uplink. In some aspects, the BS and the UE may communicate on an unlicensed radio frequency spectrum band, such as an LAA unlicensed radio frequency spectrum band, an NR-U unlicensed radio frequency spectrum band, and/or the like.

In some aspects, the UE may transmit an uplink communication (e.g., a PUSCH communication, a PUCCH communication, and/or the like) to the BS on the uplink. As shown in FIG. 9, and by reference number 902, the UE may receive, from the BS, an uplink scheduling grant that schedules an uplink resource for transmission of an uplink communication. In some aspects, the UE may perform an LBT procedure for the uplink communication to contend for radio resources on the unlicensed radio frequency spectrum band for transmitting the uplink communication in the uplink resource.

As further shown in FIG. 9, and by reference number 904, the UE may determine that the LBT procedure for the uplink communication will not complete prior to the uplink resource. For example, the UE may determine that a duration of an LBT contention window of the LBT procedure at least partially overlaps with the uplink resource in the time domain.

As further shown in FIG. 9, and by reference number 906, instead of transmitting the uplink communication in the uplink resource, the UE may transmit an indication that the transmission of the uplink communication was not completed. The UE may transmit the indication to the BS based at least in part on determining that the LBT procedure for the uplink communication will not complete prior to the uplink resource.

In some aspects, the UE may transmit the indication to the BS in an RRC communication, a MAC-CE communication, an uplink control information (UCI) communication, and/or the like. In some aspects, the UE may refrain from perform the LBT procedure or may cancel or abort the in-progress LBT procedure such that the UE is able to transmit the indication in the uplink resource. In some aspects, the UE may continue with performing the LBT procedure and may transmit the indication in another uplink resource. In this way, the BS may receive the indication from the UE and may schedule a retransmission of the uplink communication.

As indicated above, FIG. 9 is provided as one or more examples. Other examples may differ from what is described with respect to FIG. 9.

Figure 10:
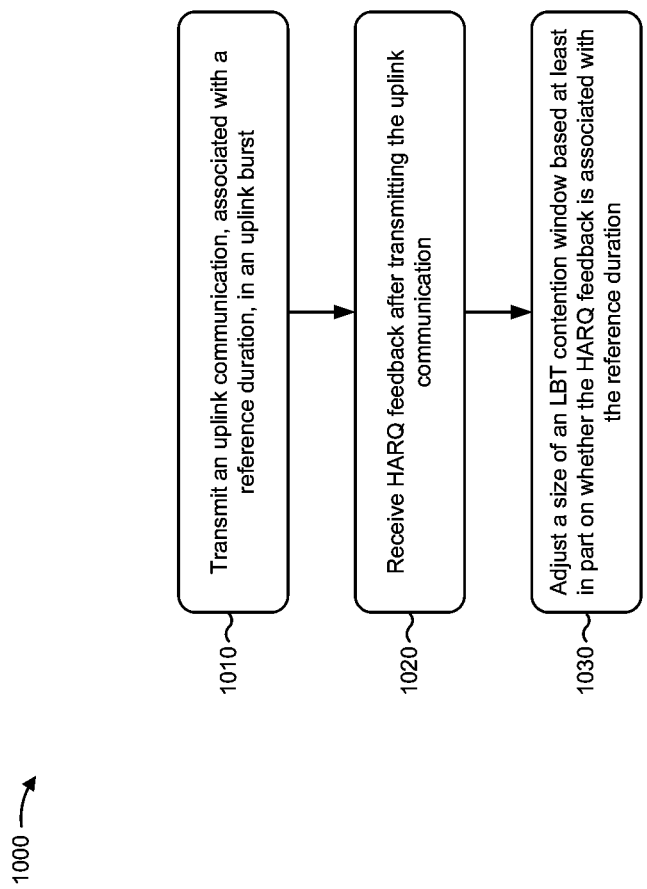
FIGS. 10-13 are diagrams illustrating example processes performed, for example, by a UE, in accordance with various aspects of the present disclosure.

FIG. 10 is a diagram illustrating an example process 1000 performed, for example, by a UE, in accordance with various aspects of the present disclosure. Example process 1000 is an example where the UE (e.g., UE 120 and/or the like) performs operations associated with contention window adjustment in NR-U.

As shown in FIG. 10, in some aspects, process 1000 may include transmitting an uplink communication, associated with a reference duration, in an uplink burst (block 1010). For example, the UE (e.g., using receive processor 258, transmit processor 264, controller/processor 280, memory 282, and/or the like) may transmit an uplink communication, associated with a reference duration, in an uplink burst, as described above.

As further shown in FIG. 10, in some aspects, process 1000 may include receiving HARQ feedback after transmitting the uplink communication (block 1020). For example, the UE (e.g., using receive processor 258, transmit processor 264, controller/processor 280, memory 282, and/or the like) may receive HARQ feedback after transmitting the uplink communication, as described above.

As further shown in FIG. 10, in some aspects, process 1000 may include adjusting a size of an LBT contention window based at least in part on whether the HARQ feedback is associated with the reference duration (block 1030). For example, the UE (e.g., using receive processor 258, transmit processor 264, controller/processor 280, memory 282, and/or the like) may adjust a size of an LBT contention window based at least in part on whether the HARQ feedback is associated with the reference duration, as described above.

Process 1000 may include additional aspects, such as any single aspect or any combination of aspects described below and/or in connection with one or more other processes described elsewhere herein.

In a first aspect, process 1000 further comprises determining that the HARQ feedback is associated with the uplink communication that is associated with the reference duration; determining that the HARQ feedback comprises an ACK; and wherein adjusting the size of the LBT contention window comprises setting the size of the LBT contention window based at least in part on determining that the HARQ feedback is an ACK and is associated with the uplink communication that is associated with the reference duration. In a second aspect, alone or in combination with the first aspect, process 1000 further comprises determining that the HARQ feedback is associated with the uplink communication that is associated with the reference duration; determining that the HARQ feedback comprises a NACK; and wherein adjusting the size of the LBT contention window comprises increasing the size of the LBT contention window based at least in part on determining that the HARQ feedback is a NACK and is associated with the uplink communication that is associated with the reference duration.

In a third aspect, alone or in combination with one or more of the first and second aspects, process 1000 further comprises determining that the HARQ feedback is not associated with the uplink communication that is associated with the reference duration; and wherein adjusting the size of the LBT contention window comprises refraining from adjusting the size of the LBT contention window based at least in part on determining that the HARQ feedback is not associated with the uplink communication that is associated with the reference duration.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
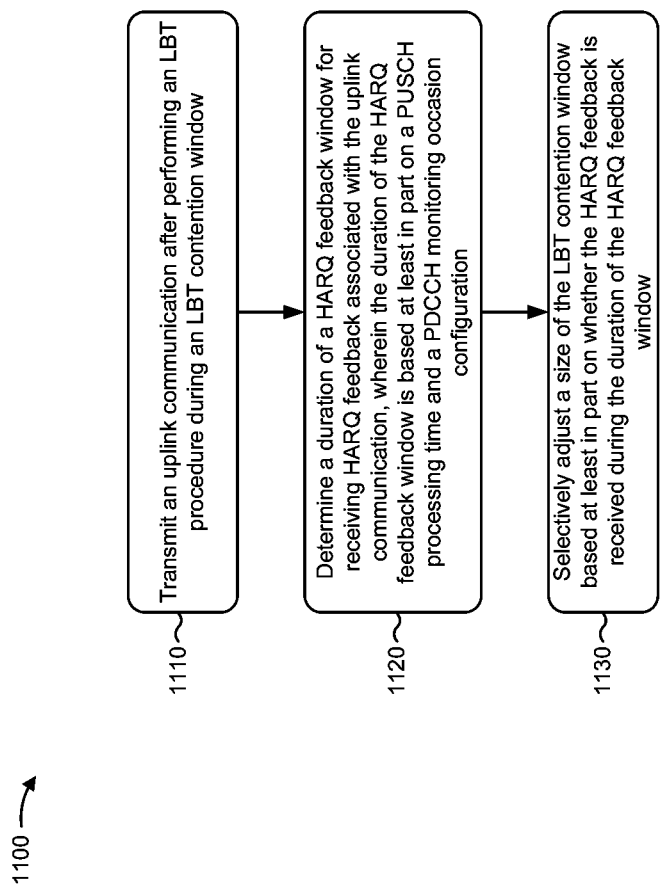

FIG. 11 is a diagram illustrating an example process 1100 performed, for example, by a UE, in accordance with various aspects of the present disclosure. Example process 1100 is an example where the UE (e.g., UE 120 and/or the like) performs operations associated with contention window adjustment in NR-U.

As shown in FIG. 11, in some aspects, process 1100 may include transmitting an uplink communication after performing an LBT procedure during an LBT contention window (block 1110). For example, the UE (e.g., using receive processor 258, transmit processor 264, controller/processor 280, memory 282, and/or the like) may transmit an uplink communication after performing an LBT procedure during an LBT contention window, as described above.

As further shown in FIG. 11, in some aspects, process 1100 may include determining a duration of a HARQ feedback window for receiving HARQ feedback associated with the uplink communication, wherein the duration of the HARQ feedback window is based at least in part on a PUSCH processing time and a PDCCH monitoring occasion configuration (block 1120). For example, the UE (e.g., using receive processor 258, transmit processor 264, controller/processor 280, memory 282, and/or the like) may determine a duration of a HARQ feedback window for receiving HARQ feedback associated with the uplink communication, as described above. In some aspects, the duration of the HARQ feedback window is based at least in part on a PUSCH processing time and a PDCCH monitoring occasion configuration.

As further shown in FIG. 11, in some aspects, process 1100 may include selectively adjusting a size of the LBT contention window based at least in part on whether the HARQ feedback is received during the duration of the HARQ feedback window (block 1130). For example, the UE (e.g., using receive processor 258, transmit processor 264, controller/processor 280, memory 282, and/or the like) may selectively adjust a size of the LBT contention window based at least in part on whether the HARQ feedback is received during the duration of the HARQ feedback window, as described above.

Process 1100 may include additional aspects, such as any single aspect or any combination of aspects described below and/or in connection with one or more other processes described elsewhere herein.

In a first aspect, process 1100 further comprises receiving an indication of the PUSCH processing time in a downlink communication. In a second aspect, alone or in combination with the first aspect, the indication of the PUSCH processing time comprises at least one of a dynamic feedback indication validity timer or a HARQ roundtrip time timer. In a third aspect, alone or in combination with one or more of the first and second aspects, determining the duration of the HARQ feedback window comprises determining the duration of the HARQ feedback window based at least in part on receiving an indication of the duration of the HARQ feedback window in a downlink communication.

In a fourth aspect, alone or in combination with one or more of the first through third aspects, determining the duration of the HARQ feedback window comprises determining an ending time of the HARQ feedback window as a next PDCCH monitoring occasion that occurs after expiration of the PUSCH processing time. In a fifth aspect, alone or in combination with one or more of the first through fourth aspects, determining the duration of the HARQ feedback window comprises determining an ending time of the HARQ feedback window as a next PDCCH monitoring occasion that occurs after expiration of the PUSCH processing time and during a discontinuous reception active time of the UE.

In a sixth aspect, alone or in combination with one or more of the first through fifth aspects, process 1100 further comprises monitoring for the HARQ feedback during the duration of the HARQ feedback window in a same cell in which the uplink communication was transmitted. In a seventh aspect, alone or in combination with one or more of the first through sixth aspects, process 1100 further comprises monitoring for the HARQ feedback during the duration of the HARQ feedback window in a cell that is different from the cell in which the uplink communication was transmitted.

In an eighth aspect, alone or in combination with one or more of the first through seventh aspects, the duration of the HARQ feedback window corresponds to a duration of a DRX retransmission timer associated with a reference uplink transmission of an uplink burst in which the uplink communication was transmitted. In a ninth aspect, alone or in combination with one or more of the first through eighth aspects, the reference uplink transmission is a last reference uplink transmission in the uplink burst. In a tenth aspect, alone or in combination with one or more of the first through ninth aspects, the reference uplink transmission is a first reference uplink transmission in the uplink burst.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
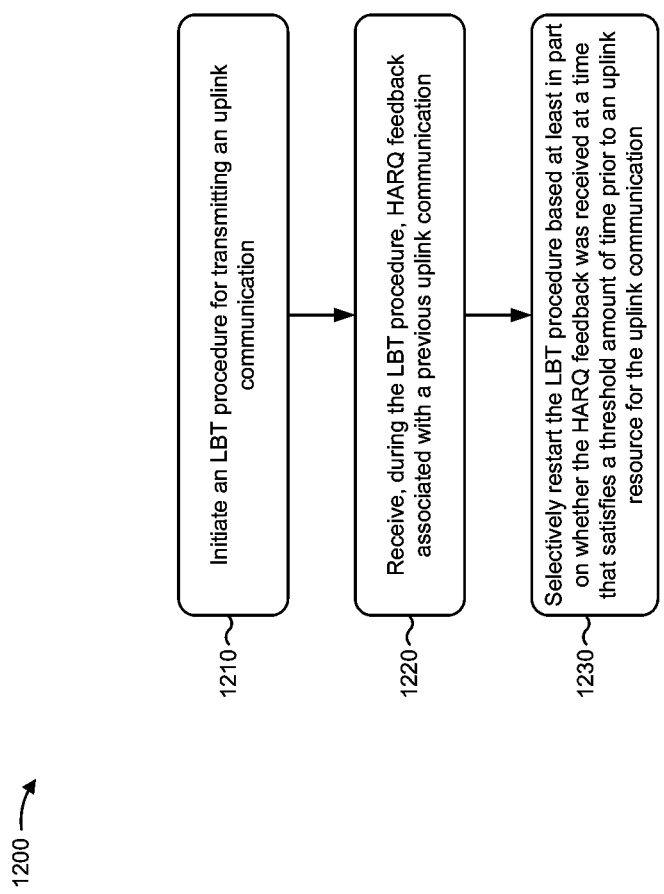

FIG. 12 is a diagram illustrating an example process 1200 performed, for example, by a UE, in accordance with various aspects of the present disclosure. Example process 1200 is an example where the UE (e.g., UE 120 and/or the like) performs operations associated with contention window adjustment in NR-U.

As shown in FIG. 12, in some aspects, process 1200 may include initiating an LBT procedure for transmitting an uplink communication (block 1210). For example, the UE (e.g., using receive processor 258, transmit processor 264, controller/processor 280, memory 282, and/or the like) may initiate an LBT procedure for transmitting an uplink communication, as described above.

As further shown in FIG. 12, in some aspects, process 1200 may include receiving, during the LBT procedure, HARQ feedback associated with a previous uplink communication (block 1220). For example, the UE (e.g., using receive processor 258, transmit processor 264, controller/processor 280, memory 282, and/or the like) may receive, during the LBT procedure, HARQ feedback associated with a previous uplink communication, as described above.

As further shown in FIG. 12, in some aspects, process 1200 may include selectively restarting the LBT procedure based at least in part on whether the HARQ feedback was received at a time that satisfies a threshold amount of time prior to an uplink resource for the uplink communication (block 1230). For example, the UE (e.g., using receive processor 258, transmit processor 264, controller/processor 280, memory 282, and/or the like) may selectively restart the LBT procedure based at least in part on whether the HARQ feedback was received at a time that satisfies a threshold amount of time prior to an uplink resource for the uplink communication, as described above.

Process 1200 may include additional aspects, such as any single aspect or any combination of aspects described below and/or in connection with one or more other processes described elsewhere herein.

In a first aspect, selectively restarting the LBT procedure comprises restarting the LBT procedure based at least in part on receiving the HARQ feedback at a time that satisfies the threshold amount of time. In a second aspect, alone or in combination with the first aspect, the process 1200 further comprises adjusting, prior to restarting the LBT procedure, a size of an LBT contention window of the LBT procedure based at least in part on the HARQ feedback. In a third aspect, alone or in combination with one or more of the first and second aspects, selectively restarting the LBT procedure comprises proceeding with the LBT procedure based at least in part on receiving the HARQ feedback at a time that does not satisfy the threshold amount of time.

In a fourth aspect, alone or in combination with one or more of the first through third aspects, the process 1200 further comprises adjusting a size of an LBT contention window of another LBT procedure after the LBT procedure based at least in part on the HARQ feedback. In a fifth aspect, alone or in combination with one or more of the first through fourth aspects, process 1200 further comprises receiving an indication of the threshold amount of time, wherein the threshold amount of time is based at least in part on a channel access priority class associated with the UE.

In a sixth aspect, alone or in combination with one or more of the first through fifth aspects, the threshold amount of time is based at least in part on an adjusted size of an LBT contention window associated with the LBT procedure, wherein the adjusted size of the LBT contention window is based at least in part on the HARQ feedback. In a seventh aspect, alone or in combination with one or more of the first through sixth aspects, the threshold amount of time is based at least in part on an adjusted LBT counter associated with the LBT procedure, wherein the adjusted LBT counter is based at least in part on the HARQ feedback.

In an eighth aspect, alone or in combination with one or more of the first through seventh aspects, the uplink resource is a first uplink resource in a plurality of consecutive uplink resources scheduled for the UE. In a ninth aspect, alone or in combination with one or more of the first through eighth aspects, the uplink resource is a last uplink resource in a plurality of consecutive uplink resources scheduled for the UE.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
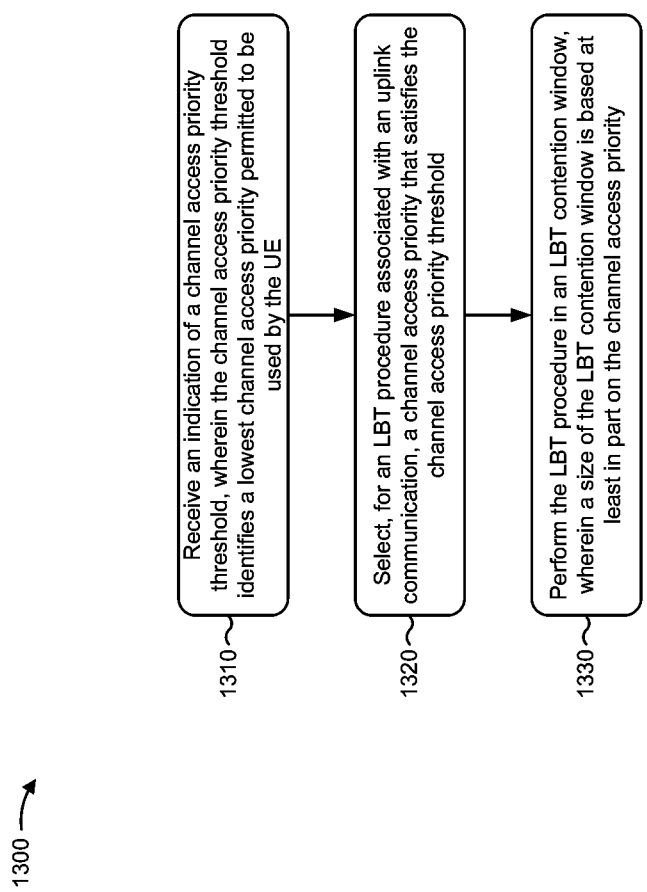

FIG. 13 is a diagram illustrating an example process 1300 performed, for example, by a UE, in accordance with various aspects of the present disclosure. Example process 1300 is an example where the UE (e.g., UE 120 and/or the like) performs operations associated with contention window adjustment in NR-U.

As shown in FIG. 13, in some aspects, process 1300 may include receiving an indication of a channel access priority threshold, wherein the channel access priority threshold identifies a lowest channel access priority permitted to be used by the UE (block 1310). For example, the UE (e.g., using receive processor 258, transmit processor 264, controller/processor 280, memory 282, and/or the like) may receive an indication of a channel access priority threshold, as described above. In some aspects, the channel access priority threshold identifies a lowest channel access priority permitted to be used by the UE.

As further shown in FIG. 13, in some aspects, process 1300 may include selecting, for an LBT procedure associated with an uplink communication, a channel access priority that satisfies the channel access priority threshold (block 1320). For example, the UE (e.g., using receive processor 258, transmit processor 264, controller/processor 280, memory 282, and/or the like) may select, for an LBT procedure associated with an uplink communication, a channel access priority that satisfies the channel access priority threshold, as described above.

As further shown in FIG. 13, in some aspects, process 1300 may include performing the LBT procedure in an LBT contention window, wherein a size of the LBT contention window is based at least in part on the channel access priority (block 1330). For example, the UE (e.g., using receive processor 258, transmit processor 264, controller/processor 280, memory 282, and/or the like) may perform the LBT procedure in an LBT contention window, as described above. In some aspects, a size of the LBT contention window is based at least in part on the channel access priority.

Process 1300 may include additional aspects, such as any single aspect or any combination of aspects described below and/or in connection with one or more other processes described elsewhere herein.

In some aspects, process 1300 further comprises transmitting an indication of the size of the LBT contention window to a base station.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
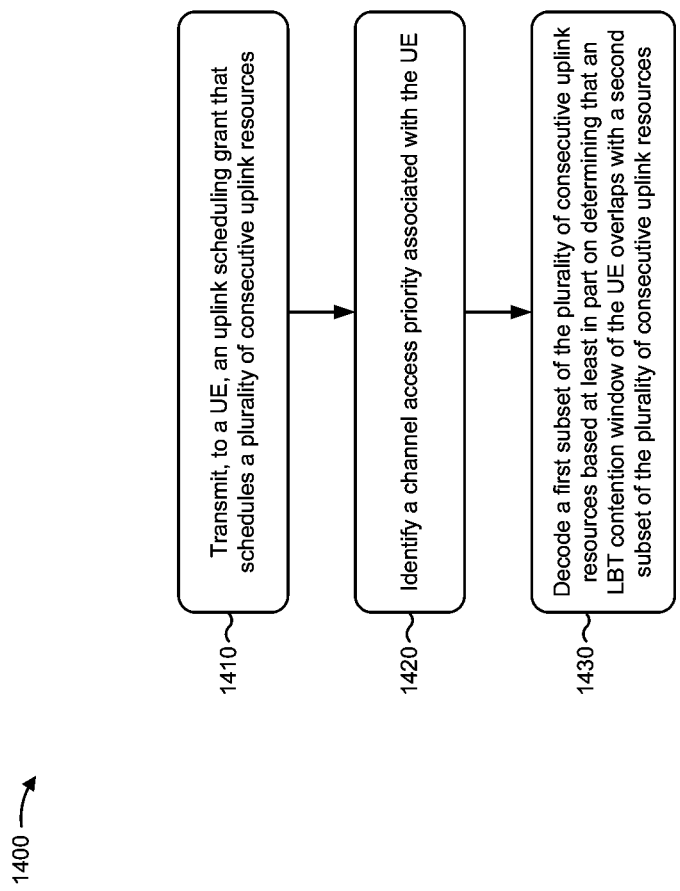
FIGS. 14 and 15 are diagrams illustrating example processes performed, for example, by a BS, in accordance with various aspects of the present disclosure.

FIG. 14 is a diagram illustrating an example process 1400 performed, for example, by a BS, in accordance with various aspects of the present disclosure. Example process 1400 is an example where the BS (e.g., BS 110 and/or the like) performs operations associated with contention window adjustment in NR-U.

As shown in FIG. 14, in some aspects, process 1400 may include transmitting, to a UE, an uplink scheduling grant that schedules a plurality of consecutive uplink resources (block 1410). For example, the BS (e.g., using transmit processor 220, receive processor 238, controller/processor 240, memory 242, and/or the like) may transmit, to a UE, an uplink scheduling grant that schedules a plurality of consecutive uplink resources, as described above.

As further shown in FIG. 14, in some aspects, process 1400 may include identifying a channel access priority associated with the UE (block 1420). For example, the BS (e.g., using transmit processor 220, receive processor 238, controller/processor 240, memory 242, and/or the like) may identify a channel access priority associated with the UE, as described above.

As further shown in FIG. 14, in some aspects, process 1400 may include decoding a first subset of the plurality of consecutive uplink resources based at least in part on determining that an LBT contention window of the UE overlaps with a second subset of the plurality of consecutive uplink resources (block 1430). For example, the BS (e.g., using transmit processor 220, receive processor 238, controller/processor 240, memory 242, and/or the like) may decode a first subset of the plurality of consecutive uplink resources based at least in part on determining that an LBT contention window of the UE overlaps with a second subset of the plurality of consecutive uplink resources, as described above.

Process 1400 may include additional aspects, such as any single aspect or any combination of aspects described below and/or in connection with one or more other processes described elsewhere herein.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
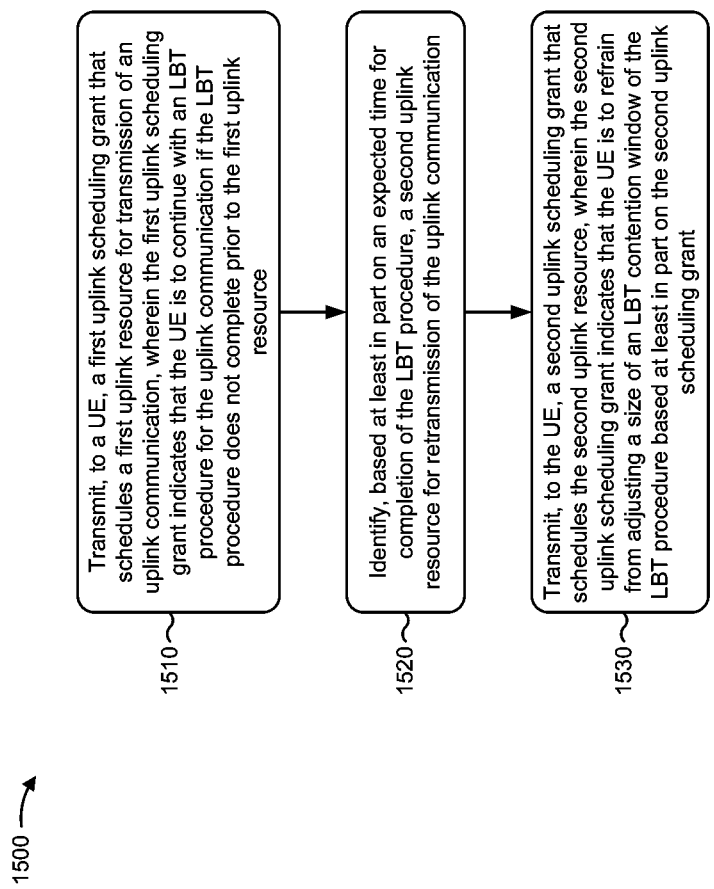

FIG. 15 is a diagram illustrating an example process 1500 performed, for example, by a BS, in accordance with various aspects of the present disclosure. Example process 1000 is an example where the BS (e.g., BS 110 and/or the like) performs operations associated with contention window adjustment in NR-U.

As shown in FIG. 15, in some aspects, process 1500 may include transmitting, to a UE, a first uplink scheduling grant that schedules a first uplink resource for transmission of an uplink communication, wherein the first uplink scheduling grant indicates that the UE is to continue with an LBT procedure for the uplink communication if the LBT procedure does not complete prior to the first uplink resource (block 1510). For example, the BS (e.g., using transmit processor 220, receive processor 238, controller/processor 240, memory 242, and/or the like) may transmit, to a UE, a first uplink scheduling grant that schedules a first uplink resource for transmission of an uplink communication, as described above. In some aspects, the first uplink scheduling grant indicates that the UE is to continue with an LBT procedure for the uplink communication if the LBT procedure does not complete prior to the first uplink resource.

As further shown in FIG. 15, in some aspects, process 1500 may include identifying, based at least in part on an expected time for completion of the LBT procedure, a second uplink resource for retransmission of the uplink communication (block 1520). For example, the BS (e.g., using transmit processor 220, receive processor 238, controller/processor 240, memory 242, and/or the like) may identify, based at least in part on an expected time for completion of the LBT procedure, a second uplink resource for retransmission of the uplink communication, as described above.

As further shown in FIG. 15, in some aspects, process 1500 may include transmitting, to the UE, a second uplink scheduling grant that schedules the second uplink resource, wherein the second uplink scheduling grant indicates that the UE is to refrain from adjusting a size of an LBT contention window of the LBT procedure based at least in part on the second uplink scheduling grant (block 1530). For example, the BS (e.g., using transmit processor 220, receive processor 238, controller/processor 240, memory 242, and/or the like) may transmit, to the UE, a second uplink scheduling grant that schedules the second uplink resource, as described above. In some aspects, the second uplink scheduling grant indicates that the UE is to refrain from adjusting a size of an LBT contention window of the LBT procedure based at least in part on the second uplink scheduling grant.

Process 1500 may include additional aspects, such as any single aspect or any combination of aspects described below and/or in connection with one or more other processes described elsewhere herein.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
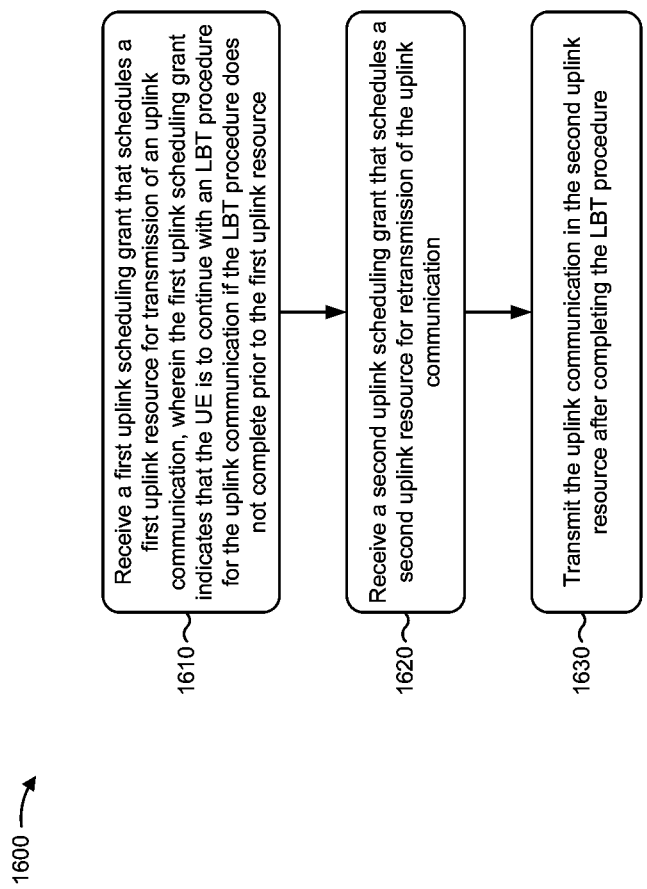
FIGS. 16-18 are diagrams illustrating example processes performed, for example, by a UE, in accordance with various aspects of the present disclosure.

FIG. 16 is a diagram illustrating an example process 1600 performed, for example, by a UE, in accordance with various aspects of the present disclosure. Example process 1600 is an example where the UE (e.g., UE 120 and/or the like) performs operations associated with contention window adjustment in NR-U.

As shown in FIG. 16, in some aspects, process 1600 may include receiving a first uplink scheduling grant that schedules a first uplink resource for transmission of an uplink communication, wherein the first uplink scheduling grant indicates that the UE is to continue with an LBT procedure for the uplink communication if the LBT procedure does not complete prior to the first uplink resource (block 1610). For example, the UE (e.g., using receive processor 258, transmit processor 264, controller/processor 280, memory 282, and/or the like) may receive a first uplink scheduling grant that schedules a first uplink resource for transmission of an uplink communication, as described above. In some aspects, the first uplink scheduling grant indicates that the UE is to continue with an LBT procedure for the uplink communication if the LBT procedure does not complete prior to the first uplink resource.

As further shown in FIG. 16, in some aspects, process 1600 may include receiving a second uplink scheduling grant that schedules a second uplink resource for retransmission of the uplink communication (block 1620). For example, the UE (e.g., using receive processor 258, transmit processor 264, controller/processor 280, memory 282, and/or the like) may receive a second uplink scheduling grant that schedules a second uplink resource for retransmission of the uplink communication, as described above.

As further shown in FIG. 16, in some aspects, process 1600 may include transmitting the uplink communication in the second uplink resource after completing the LBT procedure (block 1630). For example, the UE (e.g., using receive processor 258, transmit processor 264, controller/processor 280, memory 282, and/or the like) may transmit the uplink communication in the second uplink resource after completing the LBT procedure, as described above.

Process 1600 may include additional aspects, such as any single aspect or any combination of aspects described below and/or in connection with one or more other processes described elsewhere herein.

In some aspects, process 1600 further comprises refraining, based at least in part on an indication in the second uplink scheduling grant, from adjusting a size of an LBT contention window of the LBT procedure based at least in part on the first uplink scheduling grant.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
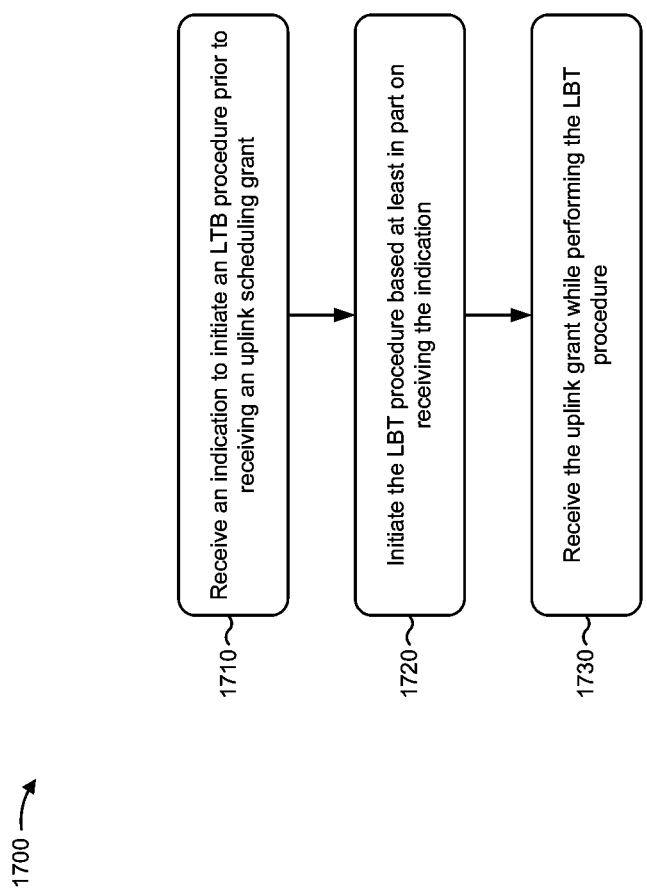

FIG. 17 is a diagram illustrating an example process 1700 performed, for example, by a UE, in accordance with various aspects of the present disclosure. Example process 1700 is an example where the UE (e.g., UE 120 and/or the like) performs operations associated with contention window adjustment in NR-U.

As shown in FIG. 17, in some aspects, process 1700 may include receiving an indication to initiate an LBT procedure prior to receiving an uplink scheduling grant (block 1710). For example, the UE (e.g., using receive processor 258, transmit processor 264, controller/processor 280, memory 282, and/or the like) may receive an indication to initiate an LBT procedure prior to receiving an uplink scheduling grant, as described above.

As further shown in FIG. 17, in some aspects, process 1700 may include initiating the LBT procedure based at least in part on receiving the indication (block 1720). For example, the UE (e.g., using receive processor 258, transmit processor 264, controller/processor 280, memory 282, and/or the like) may initiate the LBT procedure based at least in part on receiving the indication, as described above.

As further shown in FIG. 17, in some aspects, process 1700 may include receiving the uplink scheduling grant while performing the LBT procedure (block 1730). For example, the UE (e.g., using receive processor 258, transmit processor 264, controller/processor 280, memory 282, and/or the like) may receive the uplink scheduling grant while performing the LBT procedure, as described above.

Process 1700 may include additional aspects, such as any single aspect or any combination of aspects described below and/or in connection with one or more other processes described elsewhere herein.

In a first aspect, process 1700 further comprises receiving another indication to perform the LBT procedure based at least in part on a particular channel access priority; and performing the LBT procedure based at least in part on the particular channel access priority. In a second aspect, alone or in combination with the first aspect, process 1700 further comprises refraining from adjusting a size of an LBT contention window of the LBT procedure based at least in part on hybrid automatic repeat request feedback included in the uplink scheduling grant.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
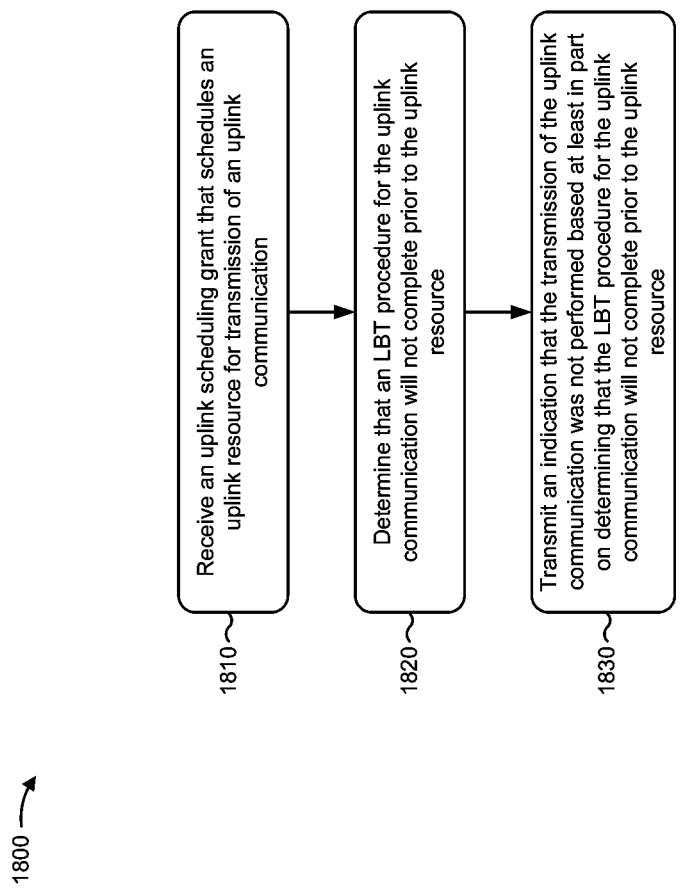

FIG. 18 is a diagram illustrating an example process 1800 performed, for example, by a UE, in accordance with various aspects of the present disclosure. Example process 1800 is an example where the UE (e.g., UE 120 and/or the like) performs operations associated with contention window adjustment in NR-U.

As shown in FIG. 18, in some aspects, process 1800 may include receiving an uplink scheduling grant that schedules an uplink resource for transmission of an uplink communication (block 1810). For example, the UE (e.g., using receive processor 258, transmit processor 264, controller/processor 280, memory 282, and/or the like) may receive an uplink scheduling grant that schedules an uplink resource for transmission of an uplink communication, as described above.

As further shown in FIG. 18, in some aspects, process 1800 may include determining that an LBT procedure for the uplink communication will not complete prior to the uplink resource (block 1820). For example, the UE (e.g., using receive processor 258, transmit processor 264, controller/processor 280, memory 282, and/or the like) may determine that an LBT procedure for the uplink communication will not complete prior to the uplink resource, as described above.

As further shown in FIG. 18, in some aspects, process 1800 may include transmitting an indication that the transmission of the uplink communication was not performed based at least in part on determining that the LBT procedure for the uplink communication will not complete prior to the uplink resource (block 1830). For example, the UE (e.g., using receive processor 258, transmit processor 264, controller/processor 280, memory 282, and/or the like) may transmit an indication that the transmission of the uplink communication was not performed based at least in part on determining that the LBT procedure for the uplink communication will not complete prior to the uplink resource, as described above.

Process 1800 may include additional aspects, such as any single aspect or any combination of aspects described below and/or in connection with one or more other processes described elsewhere herein.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
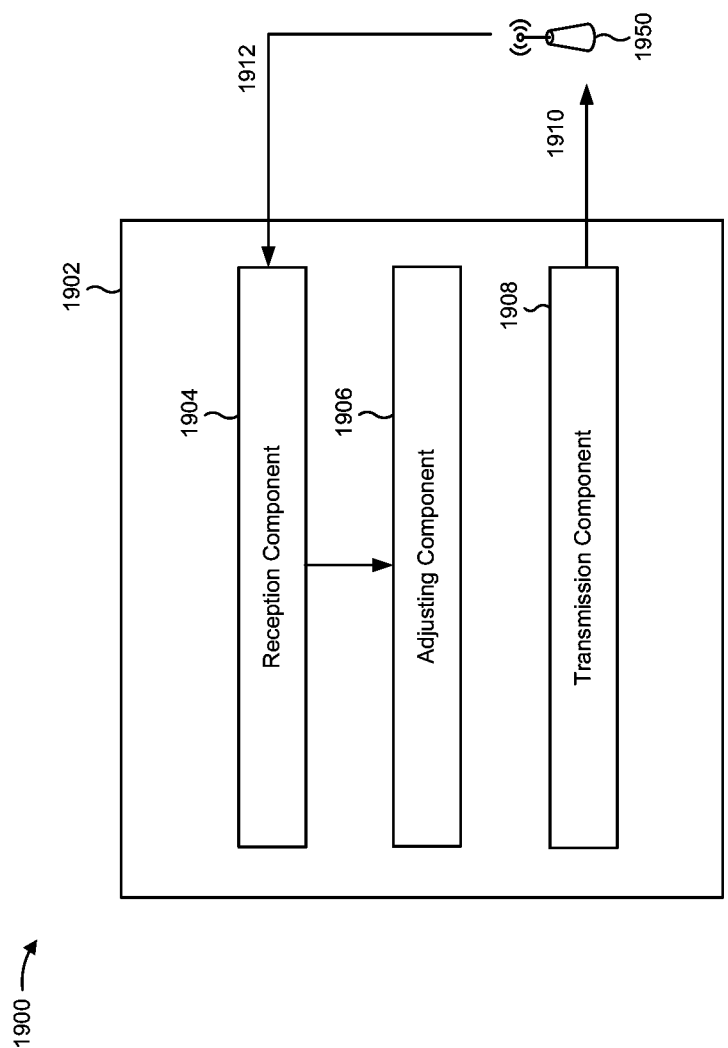
FIGS. 19-27 are conceptual data flow diagrams illustrating data flows between different modules/means/components in example apparatuses, in accordance with various aspects of the present disclosure.

FIG. 19 is a conceptual data flow diagram 1900 illustrating a data flow between different modules/means/components in an example apparatus 1902. The apparatus 1902 may be a UE (e.g., UE 120). In some aspects, the apparatus 1902 includes a reception component 1904, an adjusting component 1906, and/or a transmission component 1908.

In some aspects, transmission component 1908 may transmit an uplink communication 1910, associated with a reference duration, in an uplink burst. In some aspects, transmission component 1908 may transmit the uplink communication 1910 to a BS 1950 (e.g., BS 110). In some aspects, transmission component 1908 may include an antenna (e.g., antenna 252), a MOD (e.g., MOD 254), a Tx MIMO processor (e.g., TX MIMO processor 266), a transmit processor 264, a controller/processor (e.g., controller/processor 280), a memory (e.g., memory 282), and/or the like.

In some aspects, reception component 1904 may receive HARQ feedback 1912 after transmitting the uplink communication 1910. In some aspects, reception component 1904 may receive the HARQ feedback 1912 from the BS 1950. In some aspects, reception component 1904 may include an antenna (e.g., antenna 252), a DEMOD (e.g., DEMOD 254), a MIMO detector (e.g., MIMO detector 256), a receive processor 258, a controller/processor (e.g., controller/processor 280), a memory (e.g., memory 282), and/or the like.

In some aspects, adjusting component 1906 may adjust a size of an LBT contention window based at least in part on whether the HARQ feedback 1912 is associated with the reference duration. For example, adjusting component 1906 may determine that the HARQ feedback 1912 is associated with the reference duration (e.g., associated with the uplink communication that is associated with the reference, may determine that the HARQ feedback 1912 comprises an ACK, and may set the size of the LBT contention window based at least in part on determining that the HARQ feedback 1912 is an ACK and is associated with the reference duration (e.g., associated with the uplink communication that is associated with the reference duration).

As another example, adjusting component 1906 may determine that the HARQ feedback 1912 is associated with the reference duration (e.g., associated with the uplink communication that is associated with the reference duration), may determine that the HARQ feedback 1912 comprises a NACK, and may increase the size of the LBT contention window based at least in part on determining that the HARQ feedback 1912 is a NACK and is associated with the reference duration (e.g., associated with the uplink communication that is associated with the reference duration). As another example, adjusting component 1906 may determine that the HARQ feedback 1912 is not associated with the reference duration (e.g., not associated with the uplink communication that is associated with the reference duration), and may refrain from adjusting the size of the LBT contention window based at least in part on determining that the HARQ feedback 1912 is not associated with the reference duration (e.g., not associated with the uplink communication that is associated with the reference duration). In some aspects, adjusting component 1906 may include a receive processor (e.g., receive processor 258), a transmit processor 264, a controller/processor (e.g., controller/processor 280), a memory (e.g., memory 282), and/or the like.

The apparatus 1902 may include additional components that perform each of the blocks of the algorithm in the aforementioned process 1000 of FIG. 10 and/or the like. Each block in the aforementioned process 1000 of FIG. 10 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of components (e.g., one or more components) shown in FIG. 19 may perform one or more functions described as being performed by another set of components shown in FIG. 19.

Figure 20:
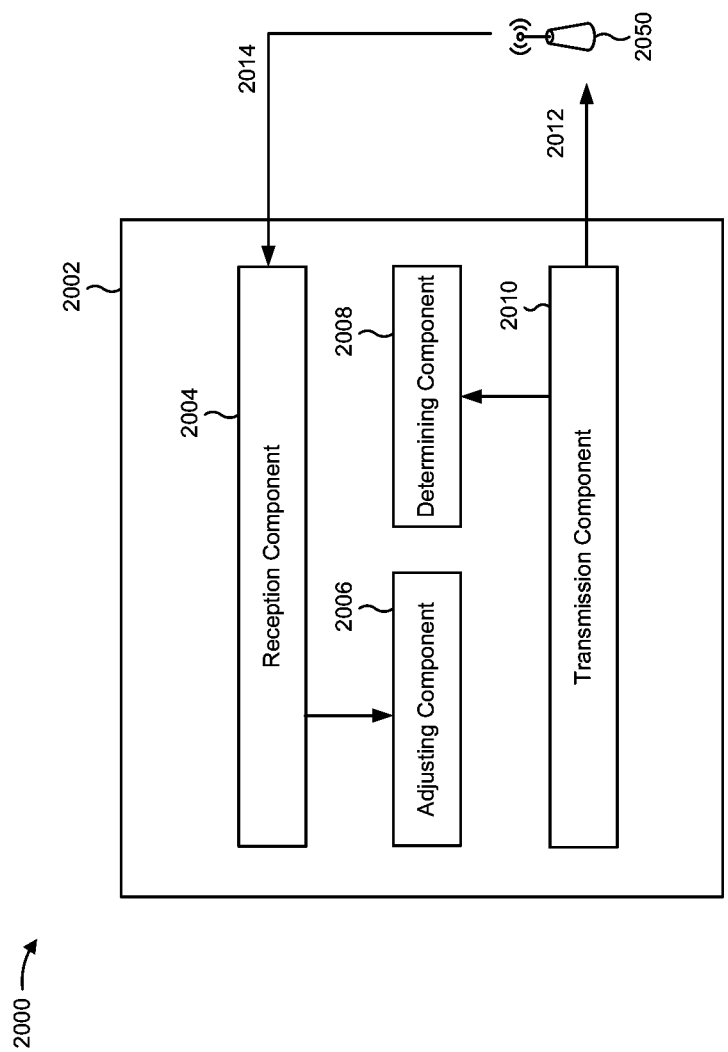

FIG. 20 is a conceptual data flow diagram 2000 illustrating a data flow between different modules/means/components in an example apparatus 2002. The apparatus 2002 may be a UE (e.g., UE 120). In some aspects, the apparatus 2002 includes a reception component 2004, an adjusting component 2006, a determining component 2008, and/or a transmission component 2010.

In some aspects, transmission component 2010 may transmit an uplink communication 2012 after performing an LBT procedure during an LBT contention window. In some aspects, transmission component 2010 may transmit the uplink communication 2012 to a BS 2050 (e.g., BS 110). In some aspects, transmission component 2010 may include an antenna (e.g., antenna 252), a MOD (e.g., MOD 254), a Tx MIMO processor (e.g., TX MIMO processor 266), a transmit processor 264, a controller/processor (e.g., controller/processor 280), a memory (e.g., memory 282), and/or the like.

In some aspects, determining component 2008 may determine a duration of a HARQ feedback window for receiving HARQ feedback 2014 from BS 2050. In some aspects, determining component 2008 may determine the duration of the HARQ feedback window based at least in part on a PUSCH processing time associated with the BS 2050, a PDCCH monitoring occasion configuration of the apparatus 2002, a DRX operation of the apparatus 2002, and/or the like. In some aspects, determining component 2008 may determine the duration of the HARQ feedback window based at least in part on receiving an indication of the duration of the HARQ feedback window from the BS 2050. In some aspects, determining component 2008 may include a receive processor (e.g., receive processor 258), a transmit processor 264, a controller/processor (e.g., controller/processor 280), a memory (e.g., memory 282), and/or the like.

In some aspects, reception component 2004 may monitor for and/or may receive the HARQ feedback 2014 during the duration of the HARQ feedback window. In some aspects, reception component 2004 may include an antenna (e.g., antenna 252), a DEMOD (e.g., DEMOD 254), a MIMO detector (e.g., MIMO detector 256), a receive processor 258, a controller/processor (e.g., controller/processor 280), a memory (e.g., memory 282), and/or the like.

In some aspects, adjusting component 2006 may selectively adjust a size of the LBT contention window based at least in part on whether the HARQ feedback 2014 is received during the duration of the HARQ feedback window. For example, adjusting component 2006 may determine that the HARQ feedback 2014 was received during the duration of the HARQ feedback window, may determine that the HARQ feedback 2014 comprises an ACK, and may reset the size of the LBT contention window based at least in part on determining that the HARQ feedback 2014 is an ACK.

As another example, adjusting component 2006 may determine that the HARQ feedback 2014 was received during the duration of the HARQ feedback window, may determine that the HARQ feedback 2014 comprises a NACK, and may increase the size of the LBT contention window based at least in part on determining that the HARQ feedback 2014 is a NACK. As another example, adjusting component 2006 may determine that the HARQ feedback 2014 was not received during the duration of the HARQ feedback window, and may increase the size of the LBT contention window based at least in part on determining that the HARQ feedback 2014 was not received during the duration of the HARQ feedback window. In some aspects, adjusting component 2006 may include a receive processor (e.g., receive processor 258), a transmit processor 264, a controller/processor (e.g., controller/processor 280), a memory (e.g., memory 282), and/or the like.

The apparatus 2002 may include additional components that perform each of the blocks of the algorithm in the aforementioned process 1100 of FIG. 11 and/or the like. Each block in the aforementioned process 1100 of FIG. 11 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 20 are provided as an example. In practice, there may be additional components, fewer components, different components, or differently arranged components than those shown in FIG. 20. Furthermore, two or more components shown in FIG. 20 may be implemented within a single component, or a single component shown in FIG. 20 may be implemented as multiple, distributed components. Additionally, or alternatively, a set of components (e.g., one or more components) shown in FIG. 20 may perform one or more functions described as being performed by another set of components shown in FIG. 20.

Figure 21:
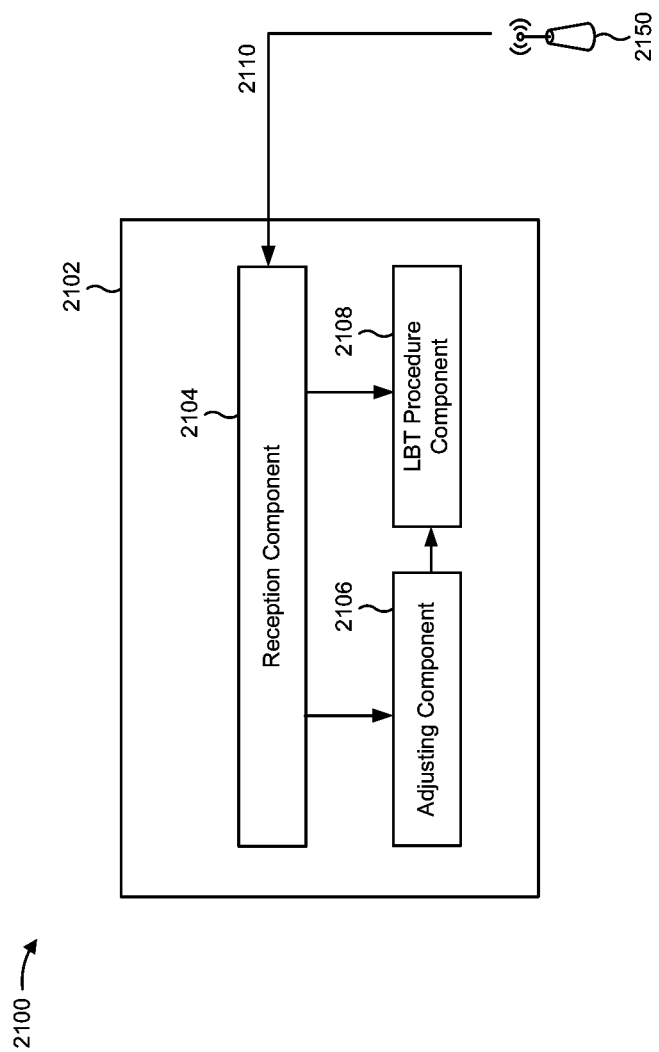

FIG. 21 is a conceptual data flow diagram 2100 illustrating a data flow between different modules/means/components in an example apparatus 2102. The apparatus 2102 may be a UE (e.g., UE 120). In some aspects, the apparatus 2102 includes a reception component 2104, an adjusting component 2106, and/or an LBT procedure component 2108.

In some aspects, LBT procedure component 2108 may initiate an LBT procedure for transmitting an uplink communication to a BS 2150 (e.g., BS 110). In some aspects, LBT procedure component 2108 may include a receive processor (e.g., receive processor 258), a transmit processor 264, a controller/processor (e.g., controller/processor 280), a memory (e.g., memory 282), and/or the like.

In some aspects, reception component 2104 may receive, during the LBT procedure, HARQ feedback 2110 associated with a previous uplink communication transmitted by the apparatus 2102. In some aspects, reception component 2104 may include an antenna (e.g., antenna 252), a DEMOD (e.g., DEMOD 254), a MIMO detector (e.g., MIMO detector 256), a receive processor 258, a controller/processor (e.g., controller/processor 280), a memory (e.g., memory 282), and/or the like.

In some aspects, adjusting component 2106 may selectively restart the LBT procedure performed by LBT procedure component 2108 based at least in part on whether the HARQ feedback 2110 was received at a time that satisfies a threshold amount of time prior to an uplink resource for the uplink communication. For example, adjusting component 2106 may restart the LBT procedure based at least in part on determining that reception component 2104 received the HARQ feedback 2110 at a time that satisfies the threshold amount of time. In some aspects, adjusting component 2016 may adjust, prior to LBT procedure component 2108 restarting the LBT procedure, a size of an LBT contention window of the LBT procedure based at least in part on the HARQ feedback 2110 and based at least in part on determining that reception component 2104 received the HARQ feedback 2110 at a time that satisfies the threshold amount of time.

As another example, adjusting component 2106 may instruct LBT procedure component 2108 to proceed with performing the LBT procedure based at least in part on determining that reception component 2104 received the HARQ feedback 2110 at a time that does not satisfy the threshold amount of time. In some aspects, adjusting component 2106 may adjust a size of an LBT contention window of another LBT procedure after the LBT procedure based at least in part on the HARQ feedback 2110. In some aspects, adjusting component 2106 may include a receive processor (e.g., receive processor 258), a transmit processor 264, a controller/processor (e.g., controller/processor 280), a memory (e.g., memory 282), and/or the like.

The apparatus 2102 may include additional components that perform each of the blocks of the algorithm in the aforementioned process 1200 of FIG. 12 and/or the like. Each block in the aforementioned process 1200 of FIG. 12 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 21 are provided as an example. In practice, there may be additional components, fewer components, different components, or differently arranged components than those shown in FIG. 21. Furthermore, two or more components shown in FIG. 21 may be implemented within a single component, or a single component shown in FIG. 21 may be implemented as multiple, distributed components. Additionally, or alternatively, a set of components (e.g., one or more components) shown in FIG. 21 may perform one or more functions described as being performed by another set of components shown in FIG. 21.

Figure 22:
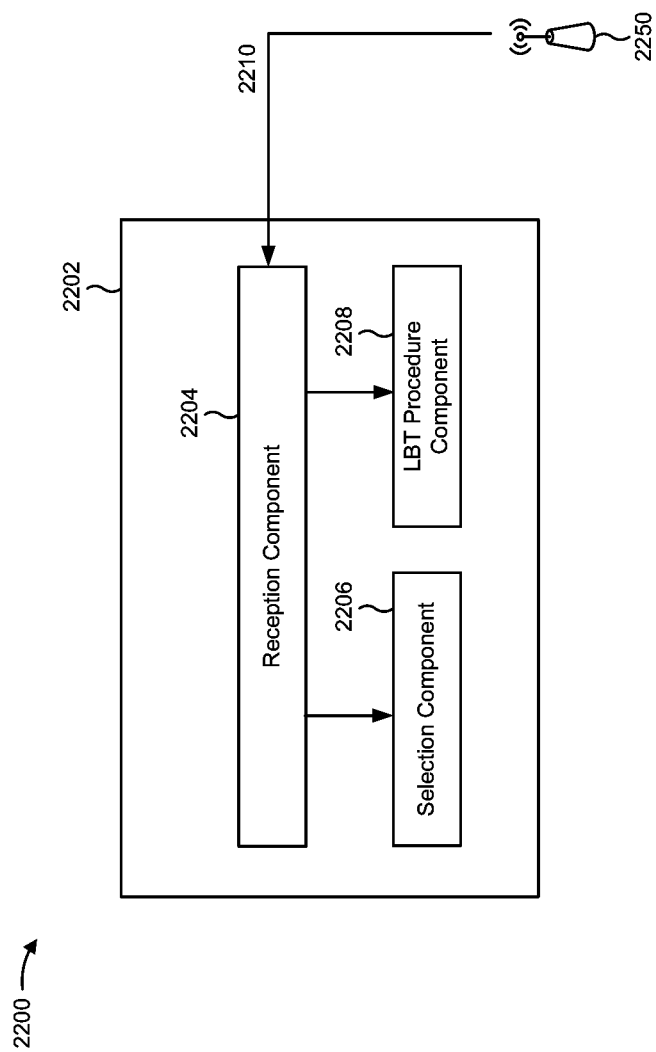

FIG. 22 is a conceptual data flow diagram 2200 illustrating a data flow between different modules/means/components in an example apparatus 2202. The apparatus 2202 may be a UE (e.g., UE 120). In some aspects, the apparatus 2002 includes a reception component 2204, a selection component 2206, and/or an LBT procedure component 2208.

In some aspects, reception component 2204 may receive an indication 2210 of a channel access priority threshold (e.g., a CAPC threshold) from a BS 2250 (e.g., BS 110). In some aspects, the channel access priority threshold identifies a lowest channel access priority permitted to be used by the LBT procedure component 2208 for performing an LBT procedure associated with transmission of an uplink communication to BS 2250. In some aspects, reception component 2204 may include an antenna (e.g., antenna 252), a DEMOD (e.g., DEMOD 254), a MIMO detector (e.g., MIMO detector 256), a receive processor 258, a controller/processor (e.g., controller/processor 280), a memory (e.g., memory 282), and/or the like.

In some aspects, selection component 2206 may select, for the LBT procedure associated with the uplink communication, a channel access priority that satisfies the channel access priority threshold. In some aspects, selection component 2206 may include a receive processor (e.g., receive processor 258), a transmit processor 264, a controller/processor (e.g., controller/processor 280), a memory (e.g., memory 282), and/or the like.

In some aspects, LBT procedure component 2208 may performing the LBT procedure in an LBT contention window. In some aspects, a size of the LBT contention window is based at least in part on the channel access priority selected by selection component 2206. In some aspects, LBT procedure component 2208 may include a receive processor (e.g., receive processor 258), a transmit processor 264, a controller/processor (e.g., controller/processor 280), a memory (e.g., memory 282), and/or the like.

The apparatus 2202 may include additional components that perform each of the blocks of the algorithm in the aforementioned process 1300 of FIG. 13 and/or the like. Each block in the aforementioned process 1300 of FIG. 13 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 22 are provided as an example. In practice, there may be additional components, fewer components, different components, or differently arranged components than those shown in FIG. 22. Furthermore, two or more components shown in FIG. 22 may be implemented within a single component, or a single component shown in FIG. 22 may be implemented as multiple, distributed components. Additionally, or alternatively, a set of components (e.g., one or more components) shown in FIG. 22 may perform one or more functions described as being performed by another set of components shown in FIG. 22.

Figure 23:
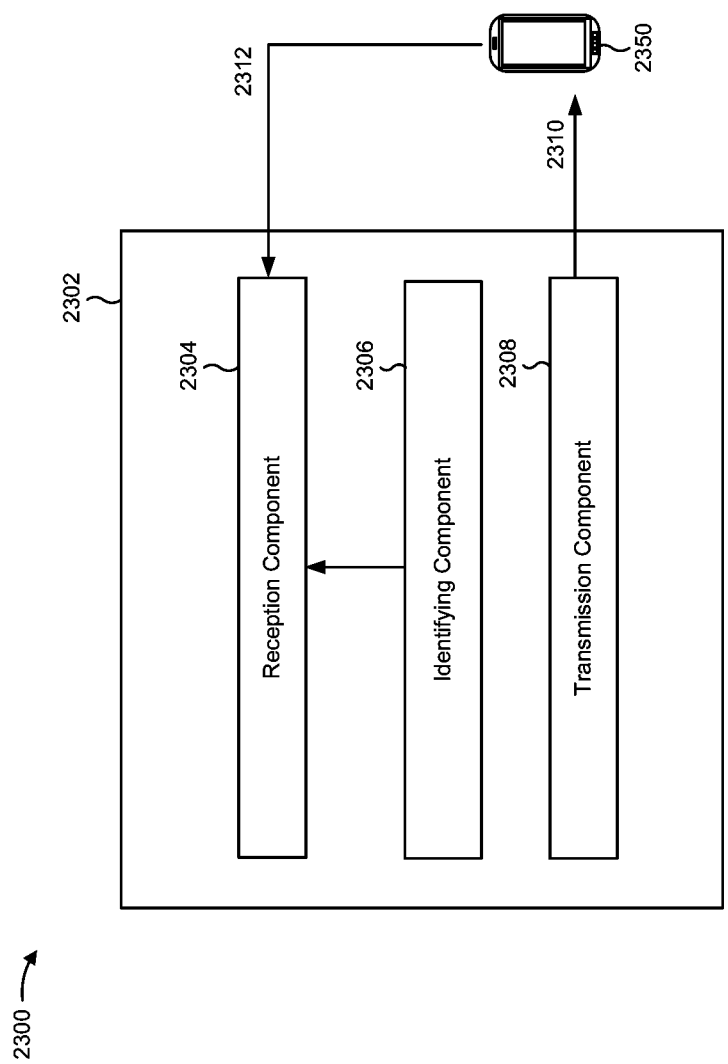

FIG. 23 is a conceptual data flow diagram 2300 illustrating a data flow between different modules/means/components in an example apparatus 2302. The apparatus 2302 may be a BS (e.g., BS 110). In some aspects, the apparatus 2302 includes a reception component 2304, an identifying component 2306, and/or a transmission component 2308.

In some aspects, transmission component 2308 may transmit, to a UE 2350 (e.g., UE 120), an uplink scheduling grant 2310 that schedules a plurality of consecutive uplink resources. In some aspects, the uplink scheduling grant 2310 may include a multi-TTI uplink scheduling grant. In some aspects, transmission component 2308 may include an antenna (e.g., antenna 234), a MOD (e.g., MOD 232), a Tx MIMO processor (e.g., TX MIMO processor 230), a transmit processor 220, a controller/processor (e.g., controller/processor 240), a memory (e.g., memory 242), and/or the like.

In some aspects, identifying component 2306 may identify a channel access priority associated with the UE 2350. In some aspects, identifying component 2306 may identify the channel access priority based at least in part on a channel access priority associated with an uplink communication 2312 scheduled by the uplink scheduling grant 2310. In some aspects, identifying component 2306 may further determine a subset of the plurality of consecutive uplink resources that are to overlap with an LBT contention window of an LBT procedure associated with the uplink communication 2312 performed by the UE 2350. In some aspects, identifying component 2306 may include a receive processor (e.g., receive processor 238), a transmit processor 220, a controller/processor (e.g., controller/processor 240), a memory (e.g., memory 242), and/or the like.

In some aspects, reception component 2304 may decode another subset of the plurality of consecutive uplink resources that do not overlap with the LBT contention window of the LBT procedure window. In some aspects, reception component 2304 may decode the other subset of the plurality of consecutive uplink resources based at least in part on identifying component 2306 determining that the LBT contention window overlaps with the subset of the plurality of consecutive uplink resources. In some aspects, reception component 2304 may receive the uplink communication 2314 in the other subset of the plurality of consecutive uplink resources. In some aspects, reception component 2304 may include an antenna (e.g., antenna 234), a DEMOD (e.g., DEMOD 232), a MIMO detector (e.g., MIMO detector 236), a receive processor 238, a controller/processor (e.g., controller/processor 240), a memory (e.g., memory 242), and/or the like.

The apparatus 2302 may include additional components that perform each of the blocks of the algorithm in the aforementioned process 1400 of FIG. 14 and/or the like. Each block in the aforementioned process 1400 of FIG. 14 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 23 are provided as an example. In practice, there may be additional components, fewer components, different components, or differently arranged components than those shown in FIG. 23. Furthermore, two or more components shown in FIG. 23 may be implemented within a single component, or a single component shown in FIG. 23 may be implemented as multiple, distributed components. Additionally, or alternatively, a set of components (e.g., one or more components) shown in FIG. 23 may perform one or more functions described as being performed by another set of components shown in FIG. 23.

Figure 24:
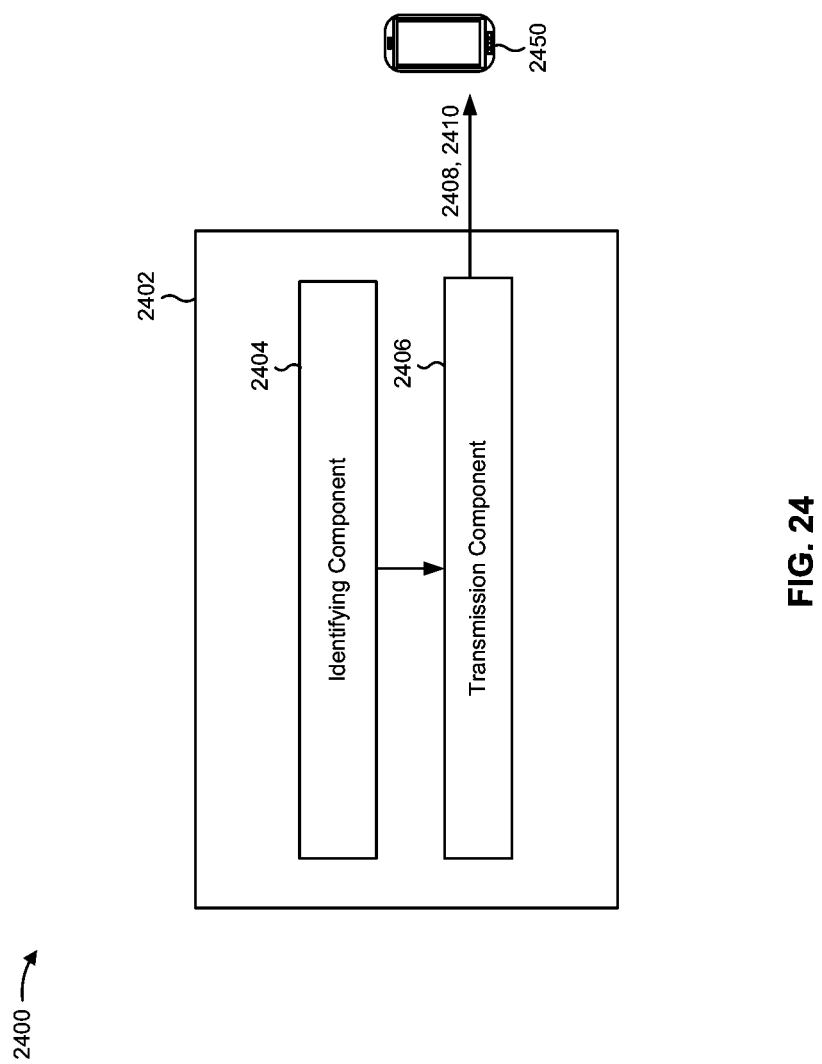

FIG. 24 is a conceptual data flow diagram 2400 illustrating a data flow between different modules/means/components in an example apparatus 2402. The apparatus 2402 may be a BS (e.g., BS 110). In some aspects, the apparatus 2402 includes an identifying component 2404, and/or a transmission component 2406.

In some aspects, transmission component 2406 may transmit, to a UE 2450 (e.g., UE 120), an uplink scheduling grant 2408 that schedules a first uplink resource for transmission of an uplink communication by the UE 2450. In some aspects, the uplink scheduling grant 2408 indicates that the UE 2450 is to continue with an LBT procedure for the uplink communication if the LBT procedure does not complete prior to the first uplink resource. In some aspects, transmission component 2406 may include an antenna (e.g., antenna 234), a MOD (e.g., MOD 232), a Tx MIMO processor (e.g., TX MIMO processor 230), a transmit processor 220, a controller/processor (e.g., controller/processor 240), a memory (e.g., memory 242), and/or the like.

In some aspects, identifying component 2404 may identify, based at least in part on an expected time for completion of the LBT procedure, a second uplink resource for retransmission of the uplink communication. In some aspects, identifying component 2404 may determine the expected time for completion of the LBT procedure based at least in part on a channel access priority (e.g., CAPC) associated with the UE 2450, the uplink communication, and/or the like. In some aspects, identifying component 2406 may include a receive processor (e.g., receive processor 238), a transmit processor 220, a controller/processor (e.g., controller/processor 240), a memory (e.g., memory 242), and/or the like.

In some aspects, transmission component 2406 may transmit, to the UE 2450, an uplink scheduling grant 2410 that schedules the second uplink resource. In some aspects, the uplink scheduling grant 2410 indicates that the UE 2450 is to refrain from adjusting a size of an LBT contention window of the LBT procedure based at least in part on the uplink scheduling grant 2410.

The apparatus 2402 may include additional components that perform each of the blocks of the algorithm in the aforementioned process 1500 of FIG. 15 and/or the like. Each block in the aforementioned process 1500 of FIG. 15 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 24 are provided as an example. In practice, there may be additional components, fewer components, different components, or differently arranged components than those shown in FIG. 24. Furthermore, two or more components shown in FIG. 24 may be implemented within a single component, or a single component shown in FIG. 24 may be implemented as multiple, distributed components. Additionally, or alternatively, a set of components (e.g., one or more components) shown in FIG. 24 may perform one or more functions described as being performed by another set of components shown in FIG. 24.

Figure 25:
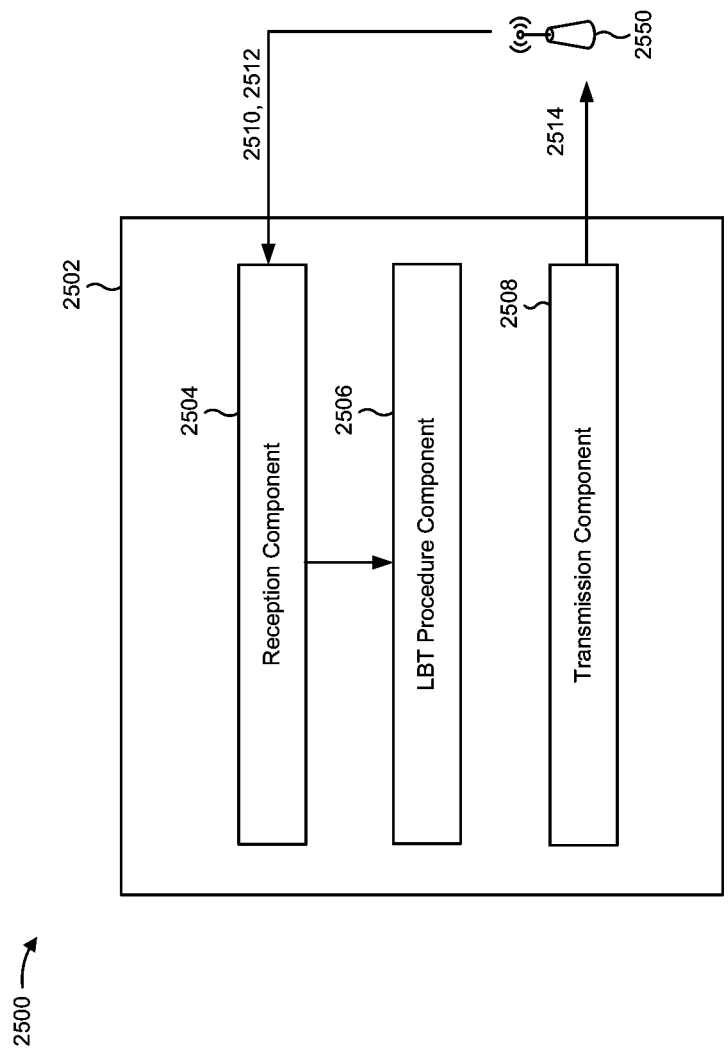

FIG. 25 is a conceptual data flow diagram 2500 illustrating a data flow between different modules/means/components in an example apparatus 2502. The apparatus 2502 may be a UE (e.g., UE 120). In some aspects, the apparatus 2502 includes a reception component 2504, an LBT procedure component 2506, and/or a transmission component 2508.

In some aspects, reception component 2504 may receive an uplink scheduling grant 2510 that schedules a first uplink resource for transmission of an uplink communication 2514. In some aspects, reception component 2504 may receive the uplink scheduling grant 2510 from a BS 2550 (e.g., BS 110). In some aspects, reception component 2504 may include an antenna (e.g., antenna 252), a DEMOD (e.g., DEMOD 254), a MIMO detector (e.g., MIMO detector 256), a receive processor 258, a controller/processor (e.g., controller/processor 280), a memory (e.g., memory 282), and/or the like.

In some aspects, LBT procedure component 2506 may perform an LBT procedure for the uplink communication 2514 based at least in part on receiving the uplink scheduling grant 2510. In some aspects, LBT procedure component 2506 may include a receive processor (e.g., receive processor 258), a transmit processor 264, a controller/processor (e.g., controller/processor 280), a memory (e.g., memory 282), and/or the like.

In some aspects, reception component 2504 may receive an uplink scheduling grant 2512 that schedules a second uplink resource for retransmission of the uplink communication 2514. In some aspects, reception component 2504 may receive the uplink scheduling grant 2512 from the BS 2550. In some aspects, reception component 2504 may receive the uplink scheduling grant 2512 while LBT procedure component 2506 performs the LBT procedure for the uplink communication 2514.

In some aspects, transmission component 2508 may transmit the uplink communication 2514 in the second uplink resource after completing the LBT procedure. In some aspects, transmission component 2508 may include an antenna (e.g., antenna 252), a MOD (e.g., MOD 254), a Tx MIMO processor (e.g., TX MIMO processor 266), a transmit processor 264, a controller/processor (e.g., controller/processor 280), a memory (e.g., memory 282), and/or the like.

The apparatus 2502 may include additional components that perform each of the blocks of the algorithm in the aforementioned process 1600 of FIG. 16 and/or the like. Each block in the aforementioned process 1600 of FIG. 16 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 25 are provided as an example. In practice, there may be additional components, fewer components, different components, or differently arranged components than those shown in FIG. 25. Furthermore, two or more components shown in FIG. 25 may be implemented within a single component, or a single component shown in FIG. 25 may be implemented as multiple, distributed components. Additionally, or alternatively, a set of components (e.g., one or more components) shown in FIG. 25 may perform one or more functions described as being performed by another set of components shown in FIG. 25.

Figure 26:
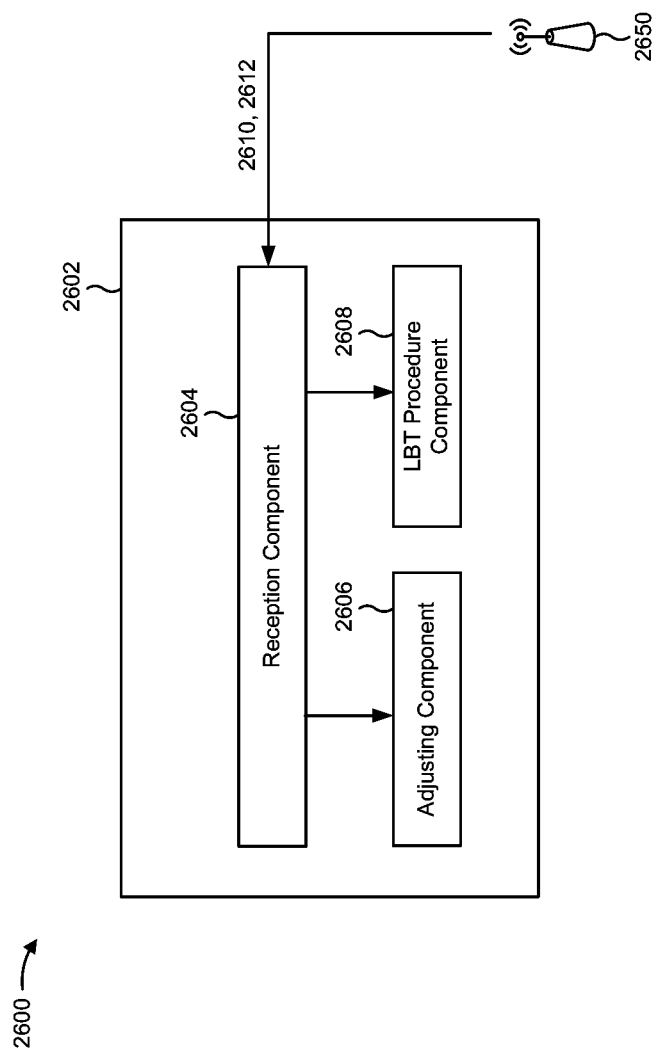

FIG. 26 is a conceptual data flow diagram 2600 illustrating a data flow between different modules/means/components in an example apparatus 2602. The apparatus 2602 may be a UE (e.g., UE 120). In some aspects, the apparatus 2602 includes a reception component 2604, an adjusting component 2606, and/or an LBT procedure component 2608.

In some aspects, reception component 2604 may receive an indication 2610 to initiate an LBT procedure prior to receiving an uplink scheduling grant 2612. In some aspects, reception component 2604 may receive the indication 2610 from a BS 2650 (e.g., BS 110). In some aspects, reception component 2604 may include an antenna (e.g., antenna 252), a DEMOD (e.g., DEMOD 254), a MIMO detector (e.g., MIMO detector 256), a receive processor 258, a controller/ processor (e.g., controller/processor 280), a memory (e.g., memory 282), and/or the like.

In some aspects, LBT procedure component 2608 initiate the LBT procedure based at least in part on receiving the indication 2610 and prior to reception component 2604 receiving the uplink scheduling grant 2612. In some aspects, LBT procedure component 2608 may include a receive processor (e.g., receive processor 258), a transmit processor 264, a controller/processor (e.g., controller/processor 280), a memory (e.g., memory 282), and/or the like.

In some aspects, reception component 2604 may receive the uplink scheduling grant 2612. In some aspects, reception component 2604 may receive the uplink scheduling grant 2612 while LBT procedure component 2608 performs the LBT procedure.

The apparatus 2602 may include additional components that perform each of the blocks of the algorithm in the aforementioned process 1700 of FIG. 17 and/or the like. Each block in the aforementioned process 1700 of FIG. 17 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 26 are provided as an example. In practice, there may be additional components, fewer components, different components, or differently arranged components than those shown in FIG. 26. Furthermore, two or more components shown in FIG. 26 may be implemented within a single component, or a single component shown in FIG. 26 may be implemented as multiple, distributed components. Additionally, or alternatively, a set of components (e.g., one or more components) shown in FIG. 26 may perform one or more functions described as being performed by another set of components shown in FIG. 26.

Figure 27:
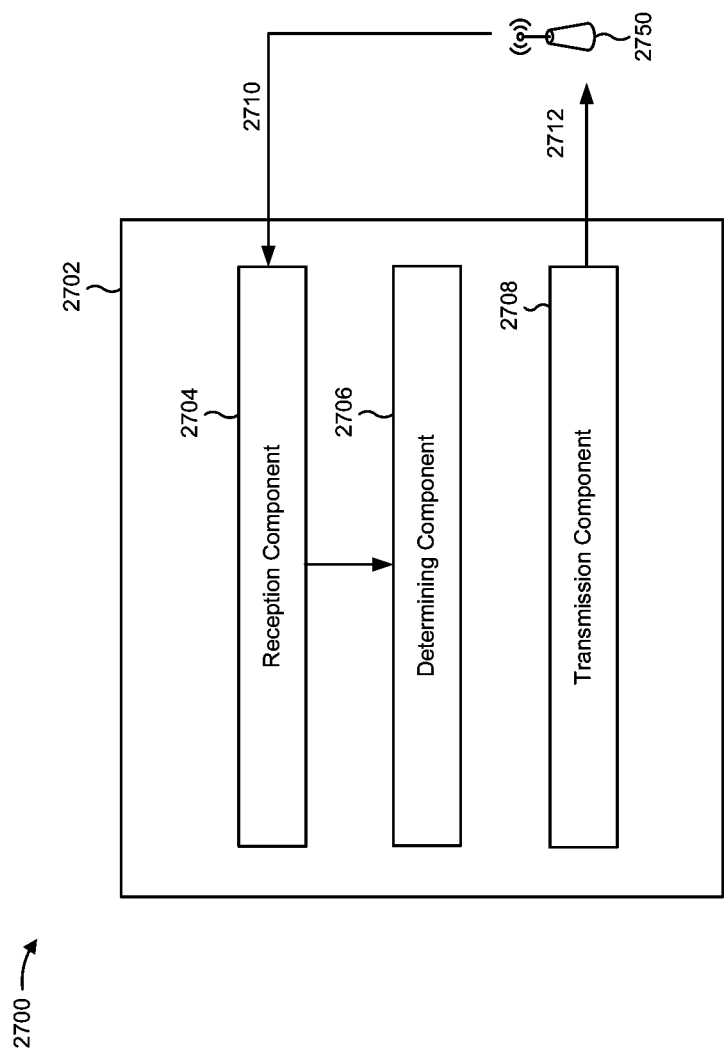

FIG. 27 is a conceptual data flow diagram 2700 illustrating a data flow between different modules/means/components in an example apparatus 2702. The apparatus 2702 may be a UE (e.g., UE 120). In some aspects, the apparatus 2702 includes a reception component 2704, a determining component 2706, and/or a transmission component 2708.

In some aspects, reception component 2704 may receive an uplink scheduling grant 2710 that schedules an uplink resource for transmission of an uplink communication. In some aspects, reception component 2704 may receive the uplink scheduling grant 2710 from a BS 2750 (e.g., BS 110). In some aspects, reception component 2704 may include an antenna (e.g., antenna 252), a DEMOD (e.g., DEMOD 254), a MIMO detector (e.g., MIMO detector 256), a receive processor 258, a controller/processor (e.g., controller/processor 280), a memory (e.g., memory 282), and/or the like.

In some aspects, determining component 2706 may determine that an LBT procedure for the uplink communication will not complete prior to the uplink resource. In some aspects, determining component 2706 may determine that the LBT procedure for the uplink communication will not complete prior to the uplink resource based at least in part on a timing between reception of the uplink scheduling grant 2710 and the uplink resources, based at least in part on a duration of an LBT contention window of the LBT procedure, based at least in part on a channel access priority (e.g., a CAPC) associated with the apparatus 2702 and/or the uplink communication, and/or the like. In some aspects, determining component 2706 may include a receive processor (e.g., receive processor 258), a transmit processor 264, a controller/processor (e.g., controller/processor 280), a memory (e.g., memory 282), and/or the like.

In some aspects, transmission component 2708 may transmit an indication 2712 that the transmission of the uplink communication was not performed based at least in part on determining component 2706 determining that the LBT procedure for the uplink communication will not complete prior to the uplink resource. In some aspects, transmission component 2708 may include an antenna (e.g., antenna 252), a MOD (e.g., MOD 254), a Tx MIMO processor (e.g., TX MIMO processor 266), a transmit processor 264, a controller/processor (e.g., controller/processor 280), a memory (e.g., memory 282), and/or the like.

The apparatus 2702 may include additional components that perform each of the blocks of the algorithm in the aforementioned process 1800 of FIG. 18 and/or the like. Each block in the aforementioned process 1800 of FIG. 18 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 27 are provided as an example. In practice, there may be additional components, fewer components, different components, or differently arranged components than those shown in FIG. 27. Furthermore, two or more components shown in FIG. 27 may be implemented within a single component, or a single component shown in FIG. 27 may be implemented as multiple, distributed components. Additionally, or alternatively, a set of components (e.g., one or more components) shown in FIG. 27 may perform one or more functions described as being performed by another set of components shown in FIG. 27.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   transmitting an uplink communication, associated with a reference duration and a channel access priority that satisfies a channel access priority threshold, in an uplink burst;
   receiving hybrid automatic repeat request (HARQ) feedback after transmitting the uplink communication; and
   adjusting a size of a listen before talk (LBT) contention window based at least in part on the channel access priority and on whether the HARQ feedback is associated with the reference duration.

2. The method of claim 1, further comprising:
   determining that the HARQ feedback is associated with the uplink communication that is associated with the reference duration; and
   determining that the HARQ feedback comprises an acknowledgement (ACK).

3. The method of claim 2, wherein adjusting the size of the LBT contention window comprises:
   resetting the size of the LBT contention window based at least in part on determining that the HARQ feedback comprises the ACK and is associated with the uplink communication that is associated with the reference duration.

4. The method of claim 1, further comprising:
   determining that the HARQ feedback is associated with the uplink communication that is associated with the reference duration; and
   determining that the HARQ feedback comprises a negative acknowledgement (NACK).

5. The method of claim 4, wherein adjusting the size of the LBT contention window comprises:
   increasing the size of the LBT contention window based at least in part on determining that the HARQ feedback comprises the NACK and is associated with the uplink communication that is associated with the reference duration.

6. The method of claim 1, further comprising:
   determining that another HARQ feedback is not associated with the uplink communication that is associated with the reference duration; and
   wherein adjusting the size of the LBT contention window comprises:
      refraining from adjusting the size of the LBT contention window based at least in part on determining that other HARQ feedback is not associated with the uplink communication that is associated with the reference duration.

7. The method of claim 1, wherein the reference duration corresponds to duration of a reference subframe.

8. The method of claim 1, wherein the HARQ feedback is received in an uplink scheduling grant.

9. A user equipment (UE) for wireless communication, comprising:
   one or more memories; and
   one or more processors, coupled to the one or more memories, configured to cause the UE to:
      transmit an uplink communication, associated with a reference duration and a channel access priority that satisfies a channel access priority threshold, in an uplink burst;
      receive hybrid automatic repeat request (HARQ) feedback after transmission of the uplink communication; and
      adjust a size of a listen before talk (LBT) contention window based at least in part on the channel access priority and on whether the HARQ feedback is associated with the reference duration.

10. The UE of claim 9, wherein the one or more processors are further configured to cause the UE to:
    determine that the HARQ feedback is associated with the uplink communication that is associated with the reference duration; and
    determine that the HARQ feedback comprises an acknowledgement (ACK).

11. The UE of claim 10, wherein the one or more processors, to cause the UE to adjust the size of the LBT contention window, are configured to cause the UE to:
    reset the size of the LBT contention window based at least in part on a determination that the HARQ feedback comprises the ACK and is associated with the uplink communication that is associated with the reference duration.

12. The UE of claim 9, wherein the one or more processors are further configured to cause the UE to:
    determine that the HARQ feedback is associated with the uplink communication that is associated with the reference duration; and
    determine that the HARQ feedback comprises a negative acknowledgement (NACK).

13. The UE of claim 12, wherein the one or more processors, to cause the UE to adjust the size of the LBT contention window, are configured to cause the UE to:
    increase the size of the LBT contention window based at least in part on a determination that the HARQ feedback comprises the NACK and is associated with the uplink communication that is associated with the reference duration.

14. The UE of claim 9, wherein the one or more processors are further configured to cause the UE to:

determine that another HARQ feedback is not associated with the uplink communication that is associated with the reference duration; and wherein the one or more processors, to cause the UE to adjust the size of the LBT contention window, are configured to cause the UE to:

refrain from adjusting the size of the LBT contention window based at least in part on determining that the other HARQ feedback is not associated with the uplink communication that is associated with the reference duration.

15. The UE of claim 9, wherein the reference duration corresponds to duration of a reference subframe.

16. The UE of claim 9, wherein the HARQ feedback is received in an uplink scheduling grant.

17. A non-transitory computer-readable medium storing a set of instructions for wireless communication, the set of instructions comprising:

one or more instructions that, when executed by one or more processors of a user equipment (UE), cause the UE to:

transmit an uplink communication, associated with a reference duration and a channel access priority that satisfies a channel access priority threshold, in an uplink burst;

receive hybrid automatic repeat request (HARQ) feedback after transmission of the uplink communication; and adjust a size of a listen before talk (LBT) contention window based at least in part on the channel access priority and on whether the HARQ feedback is associated with the reference duration.

18. The non-transitory computer-readable medium of claim 17, wherein the one or more instructions further cause the UE to:

determine that the HARQ feedback is associated with the uplink communication that is associated with the reference duration; and determine that the HARQ feedback comprises an acknowledgement (ACK).

19. The non-transitory computer-readable medium of claim 18, wherein the one or more instructions, that cause the UE to adjust the size of the LBT contention window, cause the UE to:

reset the size of the LBT contention window based at least in part on a determination that the HARQ feedback comprises the ACK and is associated with the uplink communication that is associated with the reference duration.

20. The non-transitory computer-readable medium of claim 17, wherein the one or more instructions further cause the UE to:

determine that the HARQ feedback is associated with the uplink communication that is associated with the reference duration; and determine that the HARQ feedback comprises a negative acknowledgement (NACK).

21. The non-transitory computer-readable medium of claim 20, wherein the one or more instructions, that cause the UE to adjust the size of the LBT contention window, cause the UE to:

increase the size of the LBT contention window based at least in part on a determination that the HARQ feedback comprises the NACK and is associated with the uplink communication that is associated with the reference duration.

22. The non-transitory computer-readable medium of claim 17, wherein the one or more instructions further cause the UE to:

determine that another HARQ feedback is not associated with the uplink communication that is associated with the reference duration; and wherein the one or more instructions, that cause the UE to adjust the size of the LBT contention window, cause the UE to:

refrain from adjusting the size of the LBT contention window based at least in part on a determination that the other HARQ feedback is not associated with the uplink communication that is associated with the reference duration.

23. The non-transitory computer-readable medium of claim 17, wherein the reference duration corresponds to duration of a reference subframe.

24. The non-transitory computer-readable medium of claim 17, wherein the HARQ feedback is received in an uplink scheduling grant.

25. An apparatus for wireless communication, comprising:

means for transmitting an uplink communication, associated with a reference duration and a channel access priority that satisfies a channel access priority threshold, in an uplink burst;

means for receiving hybrid automatic repeat request (HARQ) feedback after transmitting the uplink communication; and means for adjusting a size of a listen before talk (LBT) contention window based at least in part on the channel access priority and on whether the HARQ feedback is associated with the reference duration.

26. The apparatus of claim 25, further comprising:

means for determining that the HARQ feedback is associated with the uplink communication that is associated with the reference duration; and means for determining that the HARQ feedback comprises an acknowledgement (ACK).

27. The apparatus of claim 26, wherein the means for adjusting the size of the LBT contention window comprises:

means for resetting the size of the LBT contention window based at least in part on determining that the HARQ feedback comprises the ACK and is associated with the uplink communication that is associated with the reference duration.

28. The apparatus of claim 25, further comprising:

means for determining that the HARQ feedback is associated with the uplink communication that is associated with the reference duration; and means for determining that the HARQ feedback comprises a negative acknowledgement (NACK).

29. The apparatus of claim 28, wherein the means for adjusting the size of the LBT contention window comprises:

means for increasing the size of the LBT contention window based at least in part on determining that the HARQ feedback comprises the NACK and is associated with the uplink communication that is associated with the reference duration.

30. The apparatus of claim 25, further comprising:

means for determining that another HARQ feedback is not associated with the uplink communication that is associated with the reference duration; and wherein the means for adjusting the size of the LBT contention window comprises:

means for refraining from adjusting the size of the LBT contention window based at least in part on determining that the other HARQ feedback is not associated with the uplink communication that is associated with the reference duration.

\* \* \* \* \*